US006221928B1

(12) United States Patent
Kozma et al.

(10) Patent No.: US 6,221,928 B1
(45) Date of Patent: Apr. 24, 2001

(54) POLYMER ARTICLES INCLUDING MALEIC ANHYDRIDE

(75) Inventors: Matthew L. Kozma; John D. Bambara, both of Osterville; Robert F. Hurley, Centerville; Scott C. Smith, Osterville, all of MA (US)

(73) Assignee: Sentinel Products Corp., Hyannis, MA (US)

( * ) Notice: Subject to any disclaimer, the term of this patent is extended or adjusted under 35 U.S.C. 154(b) by 0 days.

(21) Appl. No.: 09/200,147

(22) Filed: Nov. 25, 1998

Related U.S. Application Data

(63) Continuation-in-part of application No. 09/003,223, filed on Jan. 6, 1998, which is a continuation-in-part of application No. 08/749,740, filed on Nov. 15, 1996, now Pat. No. 5,883,144.

(51) Int. Cl.[7] .......................................................... C08J 9/00
(52) U.S. Cl. ............................... 521/86; 521/98; 521/134; 521/140
(58) Field of Search ............................. 521/134, 98, 140, 521/86

(56) References Cited

U.S. PATENT DOCUMENTS

| | | |
|---|---|---|
| 2,254,203 | 9/1941 | Bender . |
| 2,387,730 | 10/1945 | Alderson . |
| 2,450,436 | 10/1948 | McIntire . |
| 2,515,250 | 7/1950 | McIntire . |
| 3,067,147 | 12/1962 | Roberts et al. . |
| 3,098,831 | 7/1963 | Carr et al. . |
| 3,098,832 | 7/1963 | Pooley et al. . |
| 3,287,477 | 11/1966 | Vesilind . |
| 3,335,892 | 8/1967 | Hildreth . |
| 3,379,802 | 4/1968 | Raley et al. . |
| 3,399,098 | 8/1968 | Omoto et al. . |
| 3,413,387 | 11/1968 | Ohsol . |
| 3,413,388 | 11/1968 | Lux et al. . |
| 3,431,163 | 3/1969 | Gilbert . |
| 3,539,473 | 11/1970 | Simpson et al. . |
| 3,644,230 | 2/1972 | Cronin . |
| 3,645,992 | 2/1972 | Elston . |
| 3,646,155 | 2/1972 | Scott . |
| 3,651,183 | 3/1972 | Hosoda et al. . |
| 3,711,584 | 1/1973 | Sagane et al. . |
| 3,743,611 | 7/1973 | Muori et al. . |
| 3,755,208 | 8/1973 | Ehrenfreund . |
| 3,808,300 | 4/1974 | Miyamoto et al. . |
| 3,814,779 | 6/1974 | Wiley . |
| 3,886,100 | 5/1975 | Yasuda et al. . |
| 3,949,028 | 4/1976 | Murakami et al. . |
| 3,953,558 | 4/1976 | Hatano et al. . |
| 3,954,929 | 5/1976 | Hoenke . |
| 3,959,189 | 5/1976 | Kitamori . |
| 3,960,784 | 6/1976 | Rubens . |
| 3,965,054 | 6/1976 | Nojri et al. . |
| 3,966,381 | 6/1976 | Suh . |
| 3,976,530 | 8/1976 | Callan . |
| 4,048,275 | 9/1977 | Usamoto et al. . |
| 4,058,583 | 11/1977 | Glander et al. . |
| 4,080,344 | 3/1978 | Ikeda et al. . |
| 4,102,829 | 7/1978 | Wantanabe et al. . |
| 4,110,269 | 8/1978 | Ehrenfruend . |
| 4,117,195 | 9/1978 | Swarbrick et al. . |
| 4,142,956 | 3/1979 | Shikinami et al. . |
| 4,163,085 | 7/1979 | Kuhnel et al. . |
| 4,181,762 | 1/1980 | Benedyk . |
| 4,182,398 | 1/1980 | Salyer et al. . |
| 4,203,815 | 5/1980 | Noda et al. . |
| 4,211,590 | 7/1980 | Steward et al. . |
| 4,215,202 | 7/1980 | Park . |
| 4,225,650 | 9/1980 | van Brederode et al. . |
| 4,226,946 | 10/1980 | Park et al. . |
| 4,228,255 | 10/1980 | Fujimoto et al. . |
| 4,303,756 | 12/1981 | Kajimura et al. . |
| 4,303,757 | 12/1981 | Kajimura et al. . |
| 4,337,321 | 6/1982 | Allada . |

(List continued on next page.)

FOREIGN PATENT DOCUMENTS

| | | |
|---|---|---|
| 0 584 927 A2 | 7/1983 | (EP) . |
| 0 632 077 A2 | 1/1995 | (EP) . |
| 0 702 032 A2 | 3/1996 | (EP) . |
| 62-081429 | 4/1987 | (JP) . |
| WO 90/03414 | 4/1990 | (WO) . |
| WO 92/14784 | 9/1992 | (WO) . |
| WO 93/03093 | 2/1993 | (WO) . |
| WO 93/25617 | 12/1993 | (WO) . |
| WO 96/20977 | 7/1996 | (WO) . |
| WO 97/35910 | 10/1997 | (WO) . |

OTHER PUBLICATIONS

Park, "Handbook of Polymeric Foams and Foam Technology, Polyolefin Foam," Oxford University Press, Chapter 9 pp. 156–242.

Research Disclosure, 40126 Maleic Anydride (MAn-)–Grafted Ethylene Vinyl Azetate (EVA), Sep. 1997.

*Primary Examiner*—Morton Foelak
(74) *Attorney, Agent, or Firm*—Fish & Richardson P.C.

(57) ABSTRACT

Polymer articles including maleic anhydride are described. The articles have improved characteristics and properties, such as surface bonding properties, even when the article includes a large percentage of ethylene propylene diene monomer terpolymer, ethylene-vinyl acetate, ethylene-acrylic elastomers, reclaim, or an oil.

53 Claims, 2 Drawing Sheets

U.S. PATENT DOCUMENTS

| | | |
|---|---|---|
| 4,347,329 | 8/1982 | Park . |
| 4,379,859 | 4/1983 | Hirosawa et al. . |
| 4,389,514 | 6/1983 | Schmidle et al. . |
| 4,429,059 | 1/1984 | Ozutsumi et al. . |
| 4,451,417 | 5/1984 | Akiyama et al. . |
| 4,818,789 | 4/1989 | Tomko et al. . |
| 4,837,272 | 6/1989 | Kelley . |
| 4,850,913 | 7/1989 | Szabad, Jr. . |
| 4,868,044 | 9/1989 | Tanaka et al. . |
| 4,870,111 | 9/1989 | Donuiff et al. . |
| 4,873,042 | 10/1989 | Topcik . |
| 4,900,490 | 2/1990 | Kozma . |
| 4,908,166 | 3/1990 | Salyer . |
| 4,918,111 | 4/1990 | Tanaka et al. . |
| 4,927,888 | 5/1990 | Strait et al. . |
| 4,937,284 | 6/1990 | Bergström . |
| 4,937,299 | 6/1990 | Ewen et al. . |
| 4,958,770 | 9/1990 | Mitchell . |
| 4,960,830 | 10/1990 | Hazelton et al. . |
| 5,026,736 | 6/1991 | Pontiff . |
| 5,030,662 | 7/1991 | Banerjie . |
| 5,047,476 | 9/1991 | Keogh . |
| 5,053,446 | 10/1991 | Salyer . |
| 5,057,252 | 10/1991 | Kagawa et al. . |
| 5,064,802 | 11/1991 | Stevens et al. . |
| 5,064,903 | 11/1991 | Peiffer . |
| 5,086,121 | 2/1992 | Hazelton et al. . |
| 5,093,206 | 3/1992 | Schoenbeck . |
| 5,112,919 | 5/1992 | Furrer et al. . |
| 5,151,204 | 9/1992 | Stuglinski . |
| 5,186,851 | 2/1993 | Gutierrez et al. . |
| 5,206,075 | 4/1993 | Hodgson, Jr. . |
| 5,210,150 | 5/1993 | Prejean . |
| 5,246,783 | 9/1993 | Spenadel et al. . |
| 5,247,018 | 9/1993 | Maeda et al. . |
| 5,268,115 | 12/1993 | Gutierrez et al. . |
| 5,270,377 | 12/1993 | Otawa et al. . |
| 5,272,236 | 12/1993 | Lai et al. . |
| 5,314,934 | 5/1994 | Tomka . |
| 5,318,649 | 6/1994 | Nishino et al. . |
| 5,414,039 | 5/1995 | Watson et al. . |
| 5,441,999 | 8/1995 | Jarvis et al. . |
| 5,462,975 | 10/1995 | Yamamoto et al. . |
| 5,519,076 | 5/1996 | Odaira et al. . |
| 5,565,051 | 10/1996 | Marzola et al. . |
| 5,612,510 | 3/1997 | Hildreth . |
| 5,656,675 * | 8/1997 | Kobayashi et al. .................. 521/144 |
| 5,717,000 * | 2/1998 | Karande et al. ..................... 521/144 |
| 5,824,746 * | 10/1998 | Harris et al. ......................... 525/196 |
| 5,880,241 * | 3/1999 | Brookhart et al. ................... 521/144 |

\* cited by examiner

POLYMER ARTICLES INCLUDING MALEIC ANHYDRIDE

CROSS REFERENCE TO RELATED APPLICATIONS

This application is a continuation-in-part of U.S. Ser. No. 09/003,223, filed Jan. 6, 1998, which is a continuation-in-part of Ser. No. 08/749,740 filed Nov. 15, 1996, U.S. Pat. No. 5,883,144.

BACKGROUND OF THE INVENTION

The invention relates to foamed articles including a polyolefinic polymer and maleic anhydride.

Generally, polymer materials can be used to produce a variety of articles including foamed articles. Foamed polymeric materials have a variety of uses. For example, natural rubber latex foamed articles provide soft materials for body contact and the application of cosmetics. Polyvinyl chloride (PVC) plastisol foamed articles can have a soft, durable feel that simulates leather to the touch. Open cell foamed articles based on polyurethanes have been made suitable for many applications, such as cushions for packaging, automotive applications, home bedding, filters (e.g., for air conditioners), applicators (e.g., for shoe polish), or sound attenuating panels (e.g., for rooms or acoustic speakers).

A variety of polyolefinic polymers may generally be used for each application. However, a polymer which may be desirable for one property, such as cost, may provide a lower quality end product, such as a foamed article with significant voiding.

For example ethylene-propylene diene monomer terpolymer (EPDM) is a desirable material, due to its superior temperature resistance, weather resistance, crosslinking, and non-corrosive properties. However, foamed products utilizing significant quantities of ethylene-propylene diene monomer terpolymer can exhibit poor physical characteristics, such as tackiness or incomplete cell formation, rendering them unsuitable for certain applications. Other polymers, such as high vinyl acetate content ethylene-vinyl acetate (EVA) and ethylene-acrylic elastomers, can be unsuitable for use in certain applications. Ethylene-acrylic elastomers, for example, can provide a soft hand and excellent temperature properties, but the polymeric mixture generally exhibits sticking and blocking, and as such can be difficult to process.

Further, during production, significant amounts of polymer material are frequently cut or removed from the end product. This material can be known as reclaim. It can be difficult to incorporate reclaim materials, such as crosslinked reclaim, into foamed products.

SUMMARY OF THE INVENTION

In one aspect, the invention features a foamed polymer article including a mixture including a maleic anhydride-grafted component and a first polyolefinic polymer.

The maleic anhydride can be grafted to the first polyolefinic polymer.

The maleic anhydride content of the grafted polyolefinic polymer can be between about 0.01 weight percent and about 10 weight percent, e.g., between about 0.4 weight percent and about 2.0 weight percent. The foamed article can include between about 1 weight percent and about 90 weight percent, e.g., between about 5 weight percent and about 30 weight percent, of the maleic anhydride-grafted polyolefinic polymer.

In another aspect, the invention features a method of making a foamed article. A mixture including a first polyolefinic polymer and maleic anhydride is provided. The maleic anhydride is grafted to a portion of the mixture. The mixture is cross-linked sufficiently to form a flexible polymer article having low tackiness and expanded to form a foamed article. The method can include the step of grafting maleic anhydride to the first polyolefinic polymer.

The first polyolefinic polymer can be selected from the group consisting of a low density polyethylene, a very low density polyethylene, a linear low density polyethylene, a single-site initiated polyolefin, (e.g., a single-site initiated polyethylene, a single-site initiated ethylene-propylene diene monomer terpolymer, or a single-site initiated ethylene-propylene rubber), an ethylene-propylene diene monomer terpolymer, an ethylene-propylene rubber, and an ethylene-acrylic elastomer.

The mixture can include an oil, such as a mineral oil or a silicon oil. The mixture can include greater than 25 weight percent of an oil, e.g., between 30 weight percent and 40 weight percent of an oil.

The mixture can further include a second polyolefinic polymer, such as reclaim, a ethylene-propylene diene monomer terpolymer, a ethylene-vinyl acetate, or an ethylene-acrylic elastomer.

The mixture can include between 5 weight percent and 50 weight percent, e.g., between 10 weight percent and 30 weight percent, of an ethylene-propylene diene monomer terpolymer. The mixture can include between 10 weight percent and 50 weight percent ethylene-acrylic elastomer.

The mixture can be cross-linked with a silane, with radiation, or with a peroxide, such as, for example, dicumyl peroxide.

The mixture can include between 10 weight percent and 50 weight percent reclaim, e.g., between 20 weight percent and 30 weight percent reclaim.

The expansion of the mixture can include free expansion, or compression molding of the mixture. The compression molding can include pressing the mixture using a high tonnage press at a temperature of between 240 and 480° F., e.g., between 275 and 320° F., and a pressure of between 50 and 5000 psi, e.g., between 250 and 2500 psi, for between 20 and 90 minutes followed by heating the polymer mixture at a temperature between 300 and 380° F.

The method can produce a closed cell foamed article or an open cell foam. The method can include the step of crushing the foamed article after the expanding step to form an open cell foamed article.

The method can include the step of applying a coating, an adhesive, or a laminated layer to a surface of the article. The method can include the step of dipping the article to form a layer on a surface of the article.

The foamed article can have a Shore A durometer greater than 30. The foamed article can have a foam density between about 1.5 pounds per cubic foot and 50 pounds per cubic foot. The foamed article can have a 25 percent compression deflection of less than 3 pounds per square inch.

The foamed article can be a bead or particulate foam.

In a another aspect, the invention features a polymer article including a mixture including an ethylene-acrylic polymer and maleic anhydride grafted to a component of the mixture.

The polymer article can further include a first polyolefinic polymer with the maleic anhydride grafted to the first polyolefinic polymer. The first polyolefinic polymer can be a very low density polyethylene. The first polyolefinic polymer content of the polymer article can be between about 1 weight percent and about 90 weight percent. The maleic anhydride content of the first polyolefinic polymer can be between about 0.01 weight percent and about 10 weight percent.

An open cell foamed article is a foam where there is an interconnection between cells in the foam. There can be greater than about 10 percent open cells (e.g., between 10 and 50 percent) in an open cell foamed article, preferably greater than 40 percent, more preferably greater than 80 percent, and most preferably greater than 90 percent. The amount of open cells in a foamed article can be increased by crushing the foam. A crushed open cell foamed article can have between 50 and about 98 percent open cells.

A closed cell foamed article has a predominance of closed cells. For example, a preferred closed cell foamed article can have 70 percent or greater closed cells.

The open cell content of a foamed article can be determined by measuring the amount of water that is absorbed into the foamed article when the foamed article is immersed in water. Another method is a gas-volume method using a pycnometer, such as a Quantachrome Model 1000 pycnometer, which measures the percentage of open cells according to method ASTM D-2858.

Ethylene-propylene diene monomer terpolymer (EPDM) is a terpolymer of ethylene, propylene, and a diene monomer. EPDM provides, for example, superior temperature resistance, weather resistance, crosslinking, and non-corrosive properties.

An ethylene-acrylic elastomer is a copolymer of ethylene and methyl acrylate. Ethylene-acrylic elastomers provide improved heat resistance, oil resistance, ozone resistance, weather resistance, and low temperature flexibility. Ethylene-acrylic elastomers are generally non-corrosive, and are blendable with other polymeric materials. However, non MAH-grafted ethylene acrylic elastomers frequently require long processing times, and produce sticky or non-viable foams.

High vinyl acetate content EVA copolymers have vinyl acetate contents of greater than 8 percent, preferably greater than 17 percent and more preferably greater than 28 percent.

Reclaim is a polymer material (or polymer blend) that has been discarded from a batch during a manufacturing process or a polymer material obtained from a recycling process. For example, in foamed article production, some material is cut off or removed from the edges of the final product to give a neat appearance, to size the foam, or to develop a particular shape. This material can be difficult to reincorporate into a new polymer composition without significantly detracting from the quality of the end product.

A single-site initiated polyolefin resin is a polyolefin prepared from a single-site initiator that has controlled molecular weights and molecular weight distributions. The polyolefin can be polyethylene or a copolymer of ethylene and one or more alpha-unsaturated olefin monomers (e.g., C3–C20 olefins). One class of single-site initiator is the metallocene initiators which are described, for example, in J. M. Canich, U.S. Pat. No. 5,026,798, in J. Ewen, et al., U.S. Pat. No. 4,937,299, in J. Stevens, et al., U.S. Pat. No. 5,064,802, and in J. Stevens, et al., U.S. Pat. No. 5,132,380, each of which is incorporated herein by reference. These initiators, particularly those based on group 4 transition metals, such as zirconium, titanium, or hafnium, are high activity olefin (e.g., ethylene) polymerization initiators.

A copolymer is a polymer resulting from the polymerization of two or more monomeric species and includes terpolymers (e.g., resulting from the polymerization of three monomeric species), sesquipolymers, and greater combinations of monomeric species.

Maleic anhydride-grafting is covalently bonding one or more maleic anhydride moieties to a polymer chain. The grafting can be accomplished by forming active grafting sites on the original polymer chain in the presence of maleic anhydride. Each of the sites react to form a covalent bond between the polymer and the maleic anhydride. Active grafting sites can be generated, for example, by radicals or anions.

The physical characteristics of an acceptable foamed article would generally have desirable physical characteristics such as consistency in color, appearance and utility, would be free of voids, have consistent cell sizes and shapes. In addition, consistency in density, tensile, tear, elongation, compression deflection, compression set, flexibility, and cold temperature resistance can be important in acceptable foamed articles.

Maleic anhydride (MAH) can be included in compositions to produce new and different polyolefinic foamed articles which could not previously be made. There are numerous polymer alloys or blends that have previously proven difficult to process in a foamed article including high vinyl acetate content EVA, EPDM, reclaim, or ethylene-acrylic elastomers. The combination of a MAH grafted material into the polymeric alloy allows these polymer alloys to produce acceptable foamed articles with numerous beneficial properties. The MAH graft assists in the production of both high and low density closed cell foamed articles. MAH can be included in polymer alloys in such a way that it does not adversely affect the foam's physical properties, and, in many cases, actually enhances desirable characteristics of the article.

For example, many polymeric alloys produce unacceptable or difficult-to-handle foamed articles due to severe sticking, tackiness, and blocking. By the addition of a MAH grafted material these polymeric alloys result in acceptable foamed articles which exhibit low tackiness.

A foamed article has low tackiness relative to another foamed article if it has less resistance to sliding over a common substrate. For example, a foamed article including MAH will slide over a substrate with less resistance than a foamed article including the same polymer makeup but is lacking MAH.

Ethylene-acrylic elastomer components typically produce articles that demonstrate severe sticking and blocking. Though known for having a soft hand and good low temperature performance characteristics, these materials could not be used effectively for many applications (e.g., in foamed articles). By the addition of a MAH grafted material, acceptable foamed articles can be made with ethylene-acrylic elastomers which can be processed, exhibit low tackiness, and exhibit less blocking. The foamed articles also demonstrate the soft hand and temperature performance characteristics of ethylene-acrylic elastomers.

These foamed articles can be made by crosslinking the ethylene-acrylic elastomer with a dual system, such as MAH and peroxide, or MAH and silane. The composition is then foamed with either a physical or chemical blowing agent. The ethylene-acrylic elastomer can be alloyed with other polyolefins, such as polyethylene, ethylene-vinyl acetate, ethylene-propylene diene monomer terpolymer, or polypropylene.

In addition, the higher cost of the ethylene-acrylic elastomers can be off-set with the use of lower cost fillers and oil additives. Performance temperatures to 350° F. can be achieved for foamed articles produced with ethylene-acrylic elastomers. This extends the temperature range for performance characteristics of a foam, without incurring the high cost of a fluoroelastomer. The higher temperature performance with the soft, easily conforming characteristics and high oil resistance of the ethylene-acrylic elastomer makes these foamed articles suitable for automotive gasketing applications.

The high temperature stability and oil resistance of ethylene-acrylic elastomer foamed articles can also render the materials suitable for heat transfer printing. The ethylene-acrylic elastomer foamed articles respond well to an elevated temperature sputtering paint technique which forms a permanent bond of preprinted picture to the foamed article itself. The foamed articles do not distort in the high temperature process, and the print made on the foamed article is stable and does not peel or scratch off.

Low density ethylene-acrylic elastomer containing foamed articles can also be suitable replacements for NEO-PRENE® (e.g., polychloroprene) in wet suits. Foamed articles can be produced having high elongation and high tensile strength while having good bonding strength to the fabric used for wet suit material construction. This permits the final foam/fabric composite to be pulled and tugged by the wearer with less article failure. Also, the foamed article can provide oil resistance.

A foam with a high elongation has an elongation value greater than that which would normally be anticipated for a foam or material of a given density. For example, for a 2 pound per cubic foot (pcf) polyethylene foam a high elongation would be greater than 200 percent, e.g., greater than 300 percent or 500 percent. A foam with a high tensile strength has a tensile strength greater than that which would normally be anticipated for a foam or material of a given density. For example, for a 2 pcf polyethylene foam a high tensile strength would be a 50 percent or larger increase, e.g., greater than an 80 percent or 100 percent increase. Good bonding strength indicates that the foam or foam/fabric composite or laminate would not come apart during its intended use, or that the laminate structure would tear before the bonding would separate.

Similar to the ethylene-acrylic elastomer containing foamed articles described above, high vinyl acetate content EVA copolymers generally produce materials that are mushy, sticky, tacky, have no tear strength, and exhibit excessive amounts of voiding and holes. It can be difficult to cross-link high vinyl acetate content ethylene-vinyl acetate copolymers. The addition of a maleic anhydride-grafted component to a mixture including EVA allows the use of a high vinyl acetate content EVA in a product. The maleic anhydride permits the material to be cross-linked in a manner that reduces the tackiness and maintains the flexibility of the article.

In particular, closed or open cell foamed articles (e.g., high vinyl acetate content EVA, high EPDM content, high ethylene-acrylic elastomer content, high reclaim content, and high oil content foamed articles) can be prepared and processed when maleic anhydride-grafted components are included in the mixture that is cross-linked and expanded. Foamed articles having high densities (over 20 pounds per cubic foot), medium densities (10 to 12 pounds per cubic foot), and low densities (1.5 to 2.0 pounds per cubic foot) can be prepared with these materials. The densities, or specific gravities, of the polymer resins can be measured using ASTM D-792 methods.

The resultant foamed articles are tough but soft materials that can be utilized as produced. Tough materials have a tensile strength greater than about 45 psi and a tear Die C greater than about 5 psi. Soft materials foamed articles have a Shore OO durometer of less than about 50 and a compression deflection less than about 5 psi, preferably less than 3.5 psi, and more preferably less than 3 psi. In addition to having low tackiness and good flexibility, the materials have a greater ability to be dipped (e.g., in a PVC dip coating process), coated, laminated to other materials, or bonded with an adhesive.

The addition of an MAH grafted polymer improves the processability of these foamed articles. MAH addition provides additional crosslinking capabilities that are synergistic with the other crosslinking mechanisms that can be used, such as silane or peroxide cross linking. This synergistic crosslinking provides a low initial level of polymeric crosslinking, thus aiding in the development of polymeric melt strength for desirable foaming characteristics.

The MAH addition promotes overall crosslink density for property enhancement while preventing void and crack formation that can accompany higher crosslinking levels in the absence of MAH. MAH also permits a reduction in peroxide level while maintaining high levels of crosslinking.

The foamed materials including maleic anhydride in general have several enhanced foam properties. Lower densities can be attained, less blocking and sticking of foam pieces can occur, compression recovery can be improved, resilience can be increased, and improved tensile, tear, and elongation properties can be observed. In addition, the foamed articles can have a lower compression deflection than previously achievable without using plasticized materials. The foamed articles have properties that are comparable to polyurethane foamed articles, PVC foamed articles, or elastomeric foamed articles.

Maleic anhydride-grafted materials containing EVA, EPDM, reclaim, or ethylene-acrylic elastomers can be more easily processed than materials that do not include maleic anhydride. The low tackiness of the maleic anhydride material allows continuous sheet production by horizontal and vertical foaming. In addition, melt strength can be imparted to the polymer compound which allows foaming to a lower density or to thicker gauges in vertical foaming processes.

Physical properties can be maintained even at high levels of incorporation of the fillers. Similarly, the MAH can act as a compatabilizer to and bonding agent for other additives, such as fire retardants, anti-static agents, when incorporating them into the foamed article for specific end applications. Thus, the resultant materials have characteristics which are useful in meeting specific application needs.

One such application is for a foam tape coated on both sides for use in an automotive trim bonding application. This coated tape can be used effectively to join two dissimilar materials, such as steel and aluminum. The foam characteristics compensate for the different thermal expansion characteristics of the two different metals. As temperatures increase, the foamed article can stretch. When temperatures return to ambient temperatures, the foamed article can ultimately come back to its original shape. The bonding characteristics assist the high temperature acrylic adhesive component in the tapes to keep the two materials joined. The higher temperature performance characteristics of the foamed article allow for exposure of the materials to high heat.

Soft foamed articles can shrink near the center of the foam, thereby forming a dish or a sink, which results in a loss of usable material. Foamed articles exhibiting little or no shrinkage near the center of the material reduce the amount of dishing or sinking that occurs. The addition of maleic anhydride to the materials can result in soft foamed articles having thicknesses of five inches or greater with little or no dishing or sinking.

Foamed articles can also rollover. Rollover is an expansion phenomenon in which the material folds onto itself as it expands, creating knit lines and/or voids. The incorporation of the MAH graft segment provides the capability to reduce or control rollover.

The addition of MAH also provides the capability to incorporate high levels of plasticizers and oils into polymeric alloys and promotes their retention in the polymeric system, in crosslinked and non-crosslinked articles, and in foamed and non-foamed applications. Further, MAH assists in the addition of other additives, such as fillers, pigments, specialty additives, and fire retardants, into a foamable polymeric material. The maleic anhydride can reduce leaching of colorants or other additives from the material, for example, by increasing the amount of cross-linking in the material.

The addition of MAH can also improve cell size control and uniformity in the final foamed article. MAH grafting can increase the temperature stability characteristics of foam materials, and improve adhesion characteristics to coatings and laminate structures with both similar and dissimilar materials.

Other features and advantages of the invention will be apparent from the following detailed description thereof, and from the claims.

DETAILED DESCRIPTION

Figure 1:
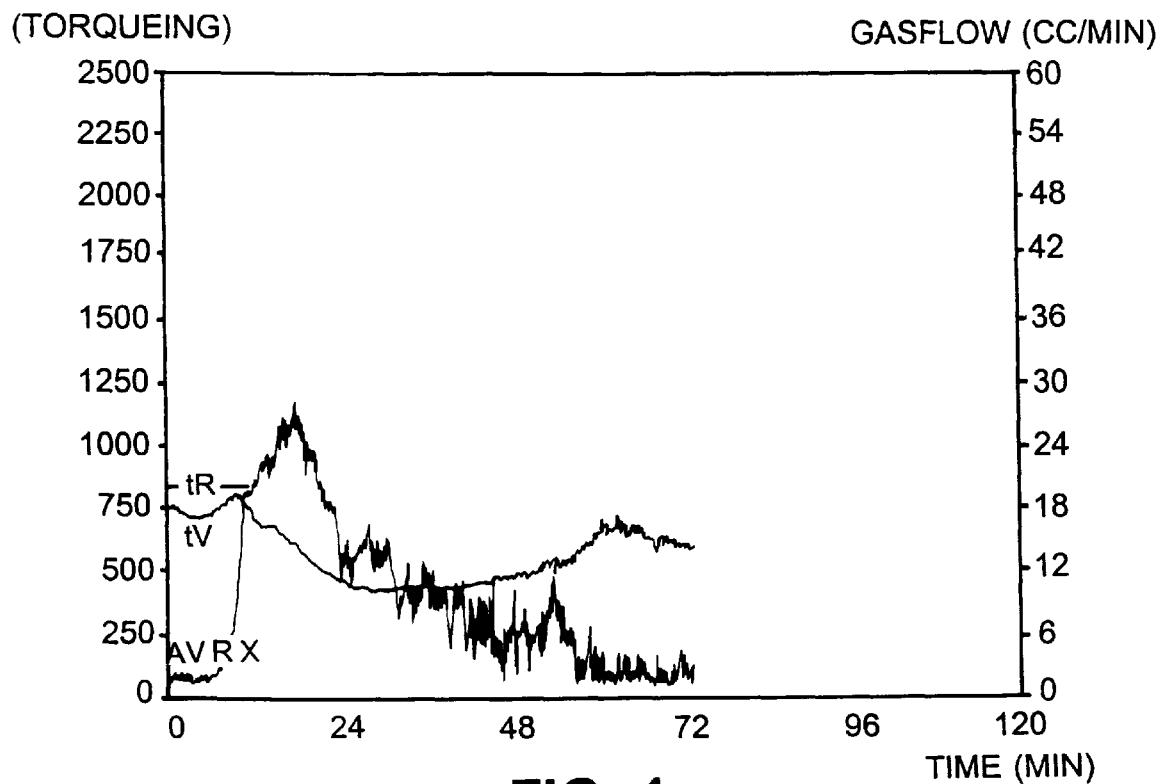
FIG. 1 is a graph depicting the cross-linking rate, as indicated by an increase in torque in a mixer over time, of a LDPE resin.

The foamed polymer articles can be prepared from a mixture including a first polyolefinic polymer and a maleic anhydride-grafted component. A portion of the mixture is cross-linked.

The polyolefinic polymer can be a ethylene-vinyl acetate (EVA) copolymer which can have a vinyl acetate content of between about 8 and 60 percent vinyl acetate. Preferably, the vinyl acetate content of the ethylene vinyl acetate copolymer is between 17 and 50 percent. Suitable EVA copolymers can have vinyl acetate (VA) contents of 9 percent, 17 percent, 23 percent, 28 percent, or 40 percent. Commercially available EVA copolymers include AT Polymers 1070C (9% VA), AT Polymers 1710 (17% VA), AT Polymers 2306 (23% VA), AT Polymers 2803 (28% VA), AT Polymers 2810 (28% VA), Chevron/Ace Plastics TD 3401 (9.5% VA), Chevron/Ace Plastics DS 4089-70 (18% VA), DuPont ELVAX 40 (40% VA), DuPont ELVAX 140-W (33% VA), DuPont ELVAX 250-W (28% VA), DuPont ELVAX 260 (28% VA), DuPont ELVAX 350 (25% VA), DuPont ELVAX 360 (25% VA), DuPont ELVAX 450 (18% VA), DuPont ELVAX 460 (18% VA), DuPont ELVAX 550 (15% VA), DuPont ELVAX 560 (15% VA), DuPont ELVAX 650 (12% VA), DuPont ELVAX 660 (12% VA), DuPont ELVAX 750 (9% VA), DuPont ELVAX 760 (9.3% VA), DuPont ELVAX 770 (9.5% VA), Exxon ESCORENE LD-740 (24.5% VA), Exxon ESCORENE LD-724 (18% VA), Exxon ESCORENE LD-721.62 (19.3% VA), Exxon ESCORENE LD-721.88 (19.3% VA), Exxon ESCORENE LD-721 (19.3% VA), Exxon ESCORENE LD-740 (24.5% VA), Exxon ESCORENE LD-318 (9% VA), Exxon ESCORENE LD-319.92 (9% VA), Exxon ESCORENE LD-725, Quantum UE 630-000 (17% VA), Quantum 637-000 (9% VA), Rexene X1903 (10% VA), Rexene X0901 (12% VA), Rexene X0911 (18% VA), and Rexene X0915 (9% VA).

In other embodiments the first polyolefinic polymer can be an ethylene-acrylic elastomer. Ethylene-acrylic elastomers are sold by DuPont under the trade name VAMAC. Commercially available VAMAC polymers include VAMAC G and VAMAC HG.

The preferred ethylene-acrylic elastomer is a terpolymer of ethylene, methyl acrylate, and a carboxylic acid cure site monomer. The ethylene:methyl acrylate ratio is preferably about 1:1; e.g., 41 weight percent ethylene and 55 weight percent methyl acrylate. The preferred weight percent of cure site monomer is 5 percent or less, e.g., 4 percent.

In other embodiments, the first polyolefinic polymer can be an EPDM polymer. Some EPR and EPDM resins are available commercially from Exxon Chemical Company, Houston, Tex., under the tradename VISTALON™, and include VISTALON™ 5800, VISTALON™ 6205, VISTALON™ 7000, VISTALON™ 7500, VISTALON™ 8000, VISTALON™ 2200, VISTALON™ 2504, VISTALON™ 2555, VISTALON™ 2727, VISTALON™ 4608, VISTALON™ 719, VISTALON™ 3708, VISTALON™ 404, VISTALON™ 457, VISTALON™ 503, VISTALON™ 707, and VISTALON™ 878. Other EPDM resins are available commercially from DuPont, Wilmington, Del., under the tradename NORDEL™ and include NORDEL™ 2522, NORDEL™ 2722, NORDEL™ 1440, NORDEL™ 1470, NORDEL™ 1145, NORDEL™ 1040, and NORDEL™ 1070.

In other embodiments the first polyolefinic polymer can be reclaimed material. Reclaim materials can be polyolefinic based polymers. Less crosslinked reclaim, e.g., having a lower gel content, is preferred.

The mixture can include other components, such as a second polyolefinic polymer or resin, which can alter the physical properties of the article. The components of the mixture can be blended before or after grafting or cross-linking.

The second polyolefinic polymer can include a polyethylene (PE), a low density polyethylene (LDPE), a very low density polyethylene (VLDPE), a linear low density polyethylene (LLDPE), a single-site initiated polyolefin (e.g., PE, LDPE, or VLDPE), a polypropylene, a single-site initiated polypropylene, an ethylene-propylene diene monomer (EPDM) terpolymer, an ethylene-propylene rubber (EPR), a single-site initiated EPDM, a single-site initiated EPR, a high density polyethylene (HDPE), a polystyrene, a styrene copolymer, an ethylene-styrene interpolymer, a polyacrylonitrile, a polybutadiene, a polyvinylchloride (PVC), a polyvinylidene chloride, a polyvinylfluoride, a polyvinylidene fluoride, a polyvinyl acetate, a polyvinyl alcohol, a polyamide, a polyacrylate (e.g., a polymethyl acrylate or a polymethyl methacrylate), a polychlorotrifluoroethylene, a polytetrafluoroethylene, a cellulose, a polyester, a polyhalocarbon, an ethylene-acrylic elastomer, reclaim, and copolymers of ethylene with propylene, isobutene, butene, hexene, octene, vinyl chloride, vinyl propionate, vinyl isobutyrate, vinyl alcohol, allyl alcohol, allyl acetate, allyl acetone, allyl benzene, allyl ether, maleic anhydride, ethyl acrylate (EEA), methyl acrylate, acrylic acid, or methacrylic acid and blends or alloys thereof.

Preferably, the second polyolefinic polymer is a LDPE, a VLDPE, a LLDPE, a single-site initiated PE, an EPDM, an EPR, a single-site initiated EPDM, or a single-site initiated EPR.

LDPE resins are described, for example, in "Petrothene Polyolefins . . . A Processing Guide," Fifth Edition, Quantum USI Division, 1986, pages 6–16, incorporated herein by reference. Some LDPE resins are commercially available from Exxon Chemical Company, Houston, Tex., Dow Plastics, Midland, Mich., Novacor Chemicals (Canada) Limited, Mississauga, Ontario, Canada, Mobil Polymers, Norwalk, Conn., Rexene Products Company, Dallas, Tex., Quantum Chemical Company, Cincinnati, Ohio, and Westlake Polymers Corporation, Houston, Tex. Commercially available LDPE resins include Eastman 1924P, Eastman 1550F, Eastman 800A, Exxon LD 117.08, Exxon LD 113.09, Dow 535I, Dow 683, Dow 760C, Dow 768I, Dow 537I, Novacor LF219A, Novacor LC05173, Novacor LC0522A, Mobil LMA-003, Mobil LFA-003, Rexene 2018 (7018), Rexene 1023, Rexene XO 875, Rexene PE5050, Rexene PE1076, Rexene PE2030, Quantum NA953, Quantum NA951, Quantum NA285-003, Quantum NA271-009, Quantum NA324, Westlake EF606AA, Westlake EF612, and Westlake EF412AA. A commercially available VLDPE is Union Carbide 1085.

A low-density polyethylene, or LDPE, is a polymer of ethylene with a density typically between 0.915 and 0.930 g cm$^{-3}$. LDPE resin densities directly relate to the resulting bulk property stiffness. This can limit the degree of mechanical flexibility in foam structures thereof since the lower limit of secant moduli for LDPE is about 20 ksi. While processability of LDPE is quite good, the physical properties, in particular the tensile strength, low-temperature flexibility and toughness, are less than would be obtained from a linear low density polyethylene (LLDPE), due in part to the substantially non-linear nature of LDPE and the profusion of long-chain branches. Since LDPE is prepared under, for example, free-radical conditions and high pressures, it is highly branched. Highly branched polymers are polymers that have approximately one to two short chain branches for every one hundred carbon atoms in the polymer backbone. A short-chain branch is a branch of a polymer backbone of 6 carbon atoms or less which can be quantified by $^{13}$C NMR spectroscopic methods. See, for example, Randall, *Rev. Macromol. Chem. Phys.*, C29 (2 & 3), p. 285–297, incorporated herein by reference.

Conventional linear low density polyethylene (LLDPE) exhibits physical properties which are superior to that of LDPE at about the same range of resin densities, but show somewhat higher secant moduli and are difficult to process, resulting in foamed articles with poor cell structure and higher than desired foam structure densities. LLDPE resins, produced by conventional Ziegler transition metal catalysts in the copolymerization of ethylene with one or more alpha-unsaturated monomers, can exhibit considerably narrower molecular weight distributions than LDPE, higher molecular weights, and typically only about 15–20 short-chain branches per 1000 carbon atoms. Commercially-available LLDPE resins with densities below about 0.910 g cm$^{-3}$ are unavailable, thus further limit the flexibility of foam structures thereof.

Very low density polyethylene (VLDPE) is a special subset of LLDPE wherein an even greater number of short-chain branches (ca. 30–50 per 1000 carbon atoms) are effected by appropriate level of comonomer to result in much lower resin densities than LLDPE, e.g. 0.88 g cm$^{-3}$ to 0.91 g cm$^{-3}$. These materials thus exhibit greater flexibility than LLDPE. However, generally with conventional linear polyolefins, the greater the number of short-chain branches, the lower the resulting resin density, and the shorter the length of the molecular backbone.

Single-site initiated polyolefinic resins are described, for example, in S.-Y. Lai, et al., U.S. Pat. Nos. 5,272,236, 5,278,272, and 5,380,810, in L. Spenadel, et al., U.S. Pat. No. 5,246,783, in C. R. Davey, et al., U.S. Pat. No. 5,322, 728, in W. J. Hodgson, Jr., U.S. Pat. No. 5,206,075, and in F. C. Stehling, et al., WO 90/03414, each of which is incorporated herein by reference. Some single-site initiated polyolefinic resins are available commercially from Exxon Chemical Company, Houston, Tex., under the tradename EXACT™, and include EXACT™ 3022, EXACT™ 3024, EXACT™ 3025, EXACT™ 3027, EXACT™ 3028, EXACT™ 3031, EXACT™ 3034, EXACT™ 3035, EXACT™ 3037, EXACT™ 4003, EXACT™ 4024, EXACT™ 4041, EXACT™ 4049, EXACT™ 4050, EXACT™ 4051, EXACT™ 5008, and EXACT™ 8002. Other single-site initiated resins are available commercially from Dow Plastics, Midland, Mich. (or DuPont/Dow), under the tradenames ENGAGE™ and AFFINITY™, and include CL8001, CL8002, EG8100, EG8150, PL1840, PL1845 (or DuPont/Dow 8445), EG8200, EG8180, GF1550, KC8852, FW1650, PL1880, HF1030, PT1409, CL8003, Dow 8452, Dow 1030, Dow 8950, Dow 8190, and D8130 (or XU583-00-01).

A component of the mixture, such as either a first or second polyolefinic polymer, is grafted with maleic anhydride. Maleic anhydride-grafting of the polyolefinic polymer or polymer blend occurs when a polymer is activated and reacts with maleic anhydride to form the graft. Levels of grafting, or graft content, can be adjusted by varying the amount of maleic anhydride introduced to the polyolefinic polymer or blend. The maleic anhydride-grafting can be carried out in a separate process, or in a continuous blending process.

Maleic anhydride-grafted materials can be prepared by reactive compounding of a material such as a polymer resin, maleic anhydride, and a grafting initiator. In general, maleic anhydride is blended with a grafting initiator which can be an organic peroxide such as dicumyl peroxide. Other suitable peroxides can be selected based on peroxide characteristics such as the decomposition half life at processing temperature and the residence time in the specific reaction process equipment.

Generally during grafting, the graft initiator is included with the maleic anhydride to perform a hydrogen abstraction from the polyolefinic resin backbone which initiates grafting of the maleic anhydride to the polymer chain. Alternatively, maleic anhydride can be grafted to a polymer through gamma or ultraviolet irradiation in the presence of a photosensitizer. Grafting yields a polymer containing covalently bonded individual succinic anhydride units formed by the reaction of maleic anhydride with the polymer. Further side reactions can provide cross-linking. Maleic anhydride grafting is described, for example, in Gaylord, "Reactive Extrusion in the Preparation of Carboxyl-Containing Polymers and Their Utilization as Compatibilizing Agents" in *Reactive Extrusion: Principles and Practice,* M. Xanthos, Ed., Carl Hanser Verlag, 1992, Ch. 3, pg. 58, and in U.S. Pat. No. 4,927,888, each of which is incorporated herein by reference.

The polymer, maleic anhydride and grafting initiator can be added to the feed section of an extruder, melted, mixed and pressurized. Maleic anhydride is a solid at room temperature and melts to a low viscosity liquid at approximately 132° F. Melted maleic anhydride can be pumped to the reactor or the solid can be preblended with the polymer prior to introduction to the reactor. The reactor can be a screw extruder (e.g., a single screw or twin screw extruder). After grafting is complete, maleic anhydride which is unreacted is removed from the blend. This can be conveniently accomplished by venting the extruder to atmosphere, or, preferably, by using a vacuum, after the reaction has been completed, and prior to passing through the die.

The grafted mixture is then forced through a die forming a strand that can be cooled and chopped into pellets for the next step in the process. Alternatively, a die that immediately chops the strands into pellets upon exiting the die can be used.

Maleic anhydride-grafted materials are available commercially, for example, from Union Carbide Corporation, Exxon Chemical Company, DuPont Industrial Polymers, or Uniroyal Chemical. Suitable materials include: VLDPE grafted with about 0.9 weight percent maleic anhydride (MAH), such as Union Carbide DEFB 1373NT; VLDPE grafted with about 0.8 weight percent MAH, such as Union Carbide DEFB 1372NT; HDPE grafted materials, such as DuPont FUSABOND E MB-100D (0.9% MAH) and Uniroyal POLYBOND 3009; LLDPE grafted with about 0.9% MAH, such as DuPont FUSABOND E MB-226D; LLDPE grafted with about 0.65% MAH, such as DuPont FUSABOND E BA-413D; ethylene propylene rubber grafted materials, such as DuPont FUSABOND N MF-416D (0.9% MAH) and DuPont FUSABOND N MF-418D (0.3% MAH); EPDM grafted materials, such as Exxon EXXELOR VA 1801 (semicrystalline, 0.6% MAH graft), Exxon EXXELOR VA 1803 (amorphous, 0.7% MAH graft), Exxon EXXELOR VA 1810 (semicrystalline, 0.5% MAH graft), Exxon EXXELOR VA 1820 (semicrystalline, 0.3% MAH graft), DuPont FUSABOND N MF-274D (0.3% MAH), Uniroyal Chemical ROYALTUF EDPM 490, and Uniroyal Chemical ROYALTUF EPDM 485; MAH grafted polypropylene materials, such as Exxon EXXELOR PP1015 (0.4% MAH), DuPont FUSABOND P MZ-109D (0.55% MAH), DuPont FUSABOND P MZ-353D (1.4% MAH), Uniroyal POLYBOND 3150, and Uniroyal POLYBOND 3200; ethylene acrylate terpolymer grafted with about 0.85% MAH, such as DuPont FUSABOND A MG-423D; ethylene vinyl acetate grafted with about 0.8% MAH, such as DuPont FUSABOND C MC-190D (28% VA) and DuPont FUSABOND C MC-197D (18% VA); MAH grafted styrene-butadiene-styrene copolymers, such as Shell KRAYTON FG1901X; and MAH grafted polyethylene terephthalate (PET) materials, available from Eastman Chemical Company. The commercial materials can be incorporated into the mixture as substitutes for or in combination with the reactive-compounded materials described above.

The grafted component can include other grafted monomers, such as di- and tri-allyl cyanurates and isocyanurates, alkyl di- and tri-acrylates and methacrylates, zinc dimethacrylates and diacrylates, styrenes, and butadiene.

The maleic anhydride-grafted component is blended with a polyolefinic polymer and cross-linking agents to form a mixture. Methods of combining the components of the foamable mixture include, for example, melt-blending, diffusion-limited imbibition, or liquid mixing. Any or all of the ingredients can be pulverized or reduced in particle-size by other methods prior to use. Blending can be accomplished by dry blending pellets of the individual components either by batch processes or as a continuous feed processes to an extruder. The components can be mixed, for example, in an internal mixer such as a Banbury mixer, a single or twin screw extruder, or any other mixer capable of providing sufficient heating for melting and fluxing for complete and uniform mixing of the materials (i.e., a laboratory two roll mill). It is preferred that the blending be carried out with temperature control. The blending or mixing provides a uniform mixture. Components can be introduced to the mixture sequentially at any step during the mixing operation. Once mixed, the hot foamable compounded mixture is sheeted, for example, through a two roll mill.

Other resins, foaming agents, and other additives can be included in the mixture. For example, a mineral oil, such as DRAKEOL #34, or a silicon oil may be added. Other additives that can be added to the foam compositions include particulate and fibrous fillers to reinforce, strengthen or modify the Theological properties of the foam composition, antioxidants (e.g., hindered phenolics such as IRGANOX 1010 or BENNOX 1010, phosphites such as IRGAFOS 168, or polymerized trimethyl-dihydroquinoline such as AGERITE AK, Resin D or FLECTOL H), ultraviolet stabilizers, thermal stabilizers, antistatic components, flame retardants, pigments, colorants, and other processing aids.

Foaming agents can be included in the mixture to produce foamed articles. The foaming agent, or expanding medium, can include a physical foaming agent or a chemical foaming agent. A physical foaming agent is a medium expanding composition that is a gas at temperatures and pressures encountered during the foam expanding step. Typically, a physical foaming agent is introduced to the polymer blend in the gaseous or liquid state and expands, for example, upon a rapid decrease in pressure.

Physical foaming agents include low molecular weight organic compounds including $C_1$–$C_6$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_1$–$C_5$ organohalogens, $C_1$–$C_6$ alcohols, $C_1$–$C_6$ ethers, $C_1$–$C_5$ esters, $C_1$–$C_5$ amines, ammonia, nitrogen, carbon dioxide, neon, or helium. The preferred foaming agents include butane, isobutane, carbon dioxide, and 1,1-difluoroethane (HFC-152a). The preferred physical foaming agent concentration prior to expanding the foamed article is between 0.5 and 30 percent.

A chemical foaming agent is compound or mixture of compounds that decomposes at elevated temperatures to form one or more gasses, which can be used to expand the compositions into a foam. In general, the chemical foaming agent will have a decomposition temperature (with the resulting liberation of gaseous material) from 130° F. to 350° F. Examples of chemical foaming agents include azodicarbonamide, p,p'-oxybis(benzene)sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazides. In addition, various acid/bicarbonate mixtures decompose into gasses when heated. The preferred chemical foaming agent concentration prior to expanding the foamed article is between 2 and 30 percent.

The addition of the MAH graft allows the crosslinking rates to be controlled. The change in cross-linking rate upon changing the presence of and amount of MAH grafted material is indicated in FIGS. 1–4.

A Brabender curve is a plot of the changing viscosity of the polymer blend due to the change in polymer rheology caused by crosslinking of the polymer or polymers. The rheology change is monitored over a given time period at a specified temperature or a specified temperature gradient. The Brabender curves of FIGS. 1–4 also show gas evolution recording capabilities. This capability monitors the foaming agent's decomposition rate to provide the gas evolution rate. Thus, the rate of crosslinking and ultimate crosslink level can be compared to the rate of blowing agent decomposition at the same point in time.

Cross-linking of the mixture can aid in the formation of desirable materials. Cross-linking can also improve the ultimate physical properties of the materials, such as flexibility and low tackiness. Cross-linking can take place prior to, during, or after expansion of the foam.

One method of cross-linking is by reaction with a peroxide. Cross-linking also can be accomplished by grafting vinyl silane groups onto a component of the mixture and activating cross-linking by exposing the mixture to moisture. Silane cross-linking can be useful for making thin gauged foamed articles such as tape grade foamed articles. A combination of peroxide and silane cross-linking can also be used. In the case of peroxide, the cross-linking can be accomplished in the beginning zones of a foaming chamber via heat activation or in another heat treatment process. Silane cross-linking can be activated by exposure to a source of moisture, for example, prior to expansion in an oven.

When cross-linking with a peroxide, heating the peroxide causes it to generate radicals which react with the components of the mixture to cause covalent cross-links in the mixture. By regulating the amounts and types of organic peroxide present in the mixture, the relative rates of radical generation, abstraction, and cross-linking steps can be controlled to permit foaming of the polymer materials. The resulting materials have high cross-link levels. Peroxide cross-linking is described in detail in Park, *Handbook of Polymeric Foam and Foam Technology*, "Polyolefin Foam," Ch. 9, pp. 186–242, incorporated herein by reference.

Hydrolyzable silanes can be grafted to a component of the mixture to make the mixture cross-linkable by exposure to moisture. Silane-grafted materials are formed by grafting a material such as a polyolefinic-polymer to an azido- or vinyl-functional silanes having the general formula RR'SiY$_2$, in which R represents an azido- or vinyl-functional radical attached to silicon through a silicon-carbon bond (e.g., composed of carbon, hydrogen, and optionally sulfur, nitrogen and oxygen), each Y represents a hydrolyzable organic radical (e.g., a radical that can be cleaved from silicon by the addition of water); and R' represents a monovalent hydrocarbon radical or a hydrolyzable organic radical. Suitable vinyl-functional silanes include vinyl-functional alkoxy silanes such as vinyl trimethoxy silane (VTMOS) and vinyl triethoxy silane (VTEOS). Silane grafting is described, for example, in U.S. Ser. No. 08/872,736, filed Jun. 11, 1997, incorporated herein by reference.

The mixture can also be cross-linked with high-energy, ionizing radiation involve the use of equipment which generates electrons, X-rays, Beta-rays or Gamma-rays. The most preferred method for cross-linking olefinic compositions through exposure to ionizing radiation is through the use of an electron-beam radiation source. Exposure of the compositions of the present invention to ionizing radiation may be accomplished at dosages in the range of about 0.1 to 50 Megarads, and preferably, at about 1 to 8 Megarads. U.S. Pat. No. 4,203,815 (Noda) discloses methods of exposing compositions to both high and low-energy ionizing radiation to effect improvements in surface quality, strength and subsequent heat-sealing or embossing processes. The amount of cross-linking may be appropriately controlled by the dosage of ionizing radiation.

Regardless of the method of cross-linking used, acceptable foamed articles can only be obtained in certain ranges of cross-linking density or level, which is related to the amount of grafting in the blend. Too much cross-linking prior to foaming can render the foamed article inelastic, resulting in less than optimal expansion and greater than optimal density for a given level of foaming agent. Too little cross-linking can be detrimental to physical properties such as compression set properties or thermal resistance, for example. It is important to choose cross-linking levels that afford foamed articles with particular desired properties. Grafting with maleic anhydride and cross-linking can increase the melt strength of the composition. The cross-linking levels can be determined by establishing the gel content of the of the composition, for example, by extraction with a solvent such as xylenes. The gel content of the foamed articles are preferably in the range of about 10 to about 95 percent, and most preferably in the range of about 25 to about 90 percent.

The graft initiator or cross-linking agent can be a radical generating species, for example, a peroxide. Examples of peroxides include dicumyl peroxide, 2,5-dimethyl-2,5-di(t-butylperoxy)hexane, 1,1-bis(t-butylperoxy)-3,3,5-trimethylcyclohexane, 1,1-di-(t-butylperoxy)cyclohexane, 2,2'-bis(t-butylperoxy)diisopropylbenzene, 4,4'-bis(t-butylperoxy)butylvalerate, t-butylperbenzoate, t-butylperterephthalate, and t-butyl peroxide. Most preferably, the graft initiator is dicumyl peroxide, such as 40 percent active dicumyl peroxide (e.g., Luperco 500 40KE).

In a continuous production process, the process steps can be categorized as reactive compounding, blending, extrusion, and cross-linking. The material from the blending step can be extruded using a conventional plastic sheet extrusion line into a prefoamed and uncross-linked sheet. This is accomplished by pumping the melted mixture through a sheet die on the end of the extruder, and passing the extruded sheet through cooling and polishing rolls. The product forms a continuous sheet which is collected in roll form. The maleic anhydride can facilitate cross-linking and handling of the foamed material in the solid sheet form.

The article can be cross-linked or expanded in a continuous process or a compression molding (e.g., batch) process.

In the continuous process, expansion to form a foamed article takes place in a foaming chamber of a continuous oven. For example, an extruded sheet can enter a heated chamber of the oven, normally supported on a mesh belt in a horizontal oven or suspended vertically in a vertical oven. The material is heated above the decomposition temperature of the chemical foaming agent contained in the mixture, thereby expanding the material into a foamed article which exits the oven as a continuous sheet. The addition of the maleic anhydride can enhance the effects of cross-linking, reduce the tackiness, and improve the strength of the material so that is can be more easily handled and conveyed throughout the process.

In a compression molding (e.g., batch) process, the sheet can be cut, for example, into the a rectangular shaped preform to fill a mold prior to foaming in a mold cavity. The preform is inserted into a the mold cavity in a preheated hydraulic press. More than one mold can be included in the hydraulic press. Once loaded, the hydraulic press is closed. The filled mold is held in the hydraulic press for predetermined press cycle time to begin the cross-linking and expanding process. The time, temperature, and clamping pressure can be modified to afford foamed articles having optimized properties.

Following the completion of the hydraulic pressing cycle, the press is released and the partially cured and expanded material is removed from the press. The partially cured and expanded material is then transported in the mold to a pre-heated secondary expansion press for a second predetermined press cycle (i.e., time, temperature, and clamping pressure that have previously been determined to optimize foam properties) to complete the cross-linking and expansion of the material.

Once the expanding and cross-linking processes are complete, or nearly complete, the foam block (e.g., bun) can be cooled and removed from the secondary expansion press and the mold cavity. Once cooled, the foam block can be washed and allowed to dry.

After cross-linking and expanding the mixture including the polyolefinic polymer and maleic anhydride grafted to a component of the mixture, the foamed article can contain open cells, closed cells, or a combination thereof. The closed cells can be converted to open cells by crushing the foamed article and allowing the material to recover. The formulation of the foamed article gives the material the physical properties necessary for recovery. The foamed article can be crushed manually, mechanically (e.g., with a press), or with a cell crushing apparatus that permits fast material throughput. The crushing device can include a pinning device that punctures closed cells. Pinning can take place before, during, or after crushing. After crushing, the open cell foamed article can have greater than 50 percent open cells (e.g., up to 98 percent). Conversion of closed cells to open cells is described in more detail, for example, in U.S. Ser. No. 08/872,736, filed Jun. 11, 1997, incorporated herein by reference.

Maleic anhydride-grafted materials can be used in molding processes to expand a particular form in mold from a mixture containing foaming agents. The non-foamed materials including a maleic-anhydride component can be in the shape of, for example, pellets, granules, chips, powder, fragments, or other small particulates which can enter small crevice areas of a mold. In this process, the expanding and cross-linking step can take place completely in the mold. Alternatively, the molding process can occur in two independent cross-linking and expanding steps. The mixture has sufficient time to flow and foamed article in difficult to fill cracks and crevices without being so cross-linked as to prevent material flow. The molding process can be used to mold products such as, for example, automotive bumpers, packaging, or footwear from the maleic anhydride-grafted materials.

The maleic anhydride-grafted materials can be used in injection molding, compression molding, transfer molding, rotational molding, slush molding, injection molding, thermoforming and/or laminating molding, or other types of molding operations. The maleic anhydride-grafted materials can also be used to form sheets, including thin, tape grade rolls. Tape grade foamed articles can have thicknesses between about 0.015 and ⅝ inch and densities between about 1.5 and 40 pounds per cubic foot. In addition, the maleic anhydride-grafted materials can be used to manufacture of solid sheet materials, cast films, extruded films, extruded coatings, wire and cable, and profile extrusions.

The maleic anydride-grafted polymers can be alloyed with many different materials, including high vinyl acetate content ethylene-vinyl acetate, and can be used in applications which require dipping, coating, lamination, or bonding to adhesives. Dip materials are described, for example, in U.S. Pat. No. 5,021,290.

Maleic anhydride grafting can increase the strength of the foamed article, permitting the use of the foamed article in applications that require an increase in tensile strength and tear resistance, such as packaging, cushioning, and shock attenuating applications. The open cell foamed articles have good flexibility at low temperatures; the foamed articles can provide cushioning over a broad range of temperatures (i.e., between −90° F. and 200° F.). The foamed articles can be used, for example, in situations where ease in skiving is necessary, such as in producing floatation vests or cushions.

The foamed articles can also be used where a soft foamed article of greater thickness is required. The foamed articles can be as large as 10 inches thick (e.g., 2 to 4 inches thick). The softness of the material can be modified by blending other polymers into the mixture before expanding to form a foamed article while maintaining the strength of the material. Similarly, the foam density can also be varied by adjusting the amount and conditions of the cross-linking and expansion steps.

The following specific examples are to be construed as merely illustrative, and not limitive, of the remainder of the disclosure.

EXAMPLE 1

A foamed article including EVA and maleic anhydride was produced in a compression molding process. A VLDPE resin was grafted with maleic anhydride (MAH) and compounded with other ingredients to give a mixture having the following formulation:

| Formulation Component | Example 1 Parts per hundred resin (PHR) |
| --- | --- |
| VLDPE (grafted with 0.9% MAH) | 10 |
| EVA (28% VA content) | 90 |
| Zinc Oxide | 0.13 |
| Azodicarbonamide | 14 |
| Dicumyl Peroxide 40% | 1.875 |
| Antioxidant | 0.2 |

The grafted polyolefinic resin and EVA were compounded with additional ingredients, including a blowing agent, activators, and an organic peroxide cross-linking agent as indicated in the above formulation. All ingredients were mixed on a two roll mill set at approximately 250° F. Mixing was accomplished by sequential addition of portions of the materials into the polymer. The fluxed and fused mixture was blended on the heated mill roll surface as is customary in mixing in this operation. Alternatively, the components can be mixed using an internal high intensity batch mixer. At the completion of the mixing operation, the hot compounded material was sheeted off the mill at approximately ⅜ inch thickness.

Multiple sheets were plied up (i.e., layered) into a preform for molding in a 1.25 inch×6 inch×6 inch high pressure hydraulic press mold while still hot. The mold containing the hot compound was put between heated high pressure hydraulic press platens under pressure for 50 minutes at 295° F. at 1000 psi. The mold was released and the resulting material was removed from the hydraulic press mold and inserted into a lower pressure mold cavity (i.e., at atmospheric pressure) of the expected final dimensions of 3 inches by 18 inches by 24 inches. The material was allowed to complete cross-linking and expansion in the lower pressure mold cavity for about 30 minutes at 330° F. The mold cavity and foamed material therein was cooled with water to room temperature. The expanded material was removed from the mold, yielding a closed cell foamed article having the physical properties summarized in Table I.

TABLE I

| Property | Example 1 |
| --- | --- |
| Density (pcf) | 2.04 |
| Tensile (psi) | 50.8 |
| Elongation (%) | 431 |
| 25% Compression Deflection (psi) | 3.26 |
| 50% Compression Deflection (psi) | 9.77 |
| 50% Compression Set (%) (ASTM-3575) | 25 |
| 50% Compression Set (%) (ASTM-1056) | 48 |
| Tear Die C (psi) | 5.8 |
| Durometer Shore A | 0 |
| Durometer Shore C | 0 |
| Durometer Shore 00 | 30 |
| Durometer Shore FWC | 8 |
| Cell size average (mm) | 0.20 |
| Cell size min. (mm) | 0.05 |
| Cell size max. (mm) | 0.40 |

EXAMPLE 2

The method described in Example 1 was used to prepare a foamed article having the following formulation:

| Formulation Component | Example 2 Parts per hundred resin (PHR) |
| --- | --- |
| VLDPE (grafted with 0.9% MAH) | 20 |
| EVA (28% VA content) | 80 |
| Zinc Oxide | 0.2 |
| Azodicarbonamide | 14 |
| Dicumyl Peroxide 40% | 1.75 |
| Antioxidant | 0.2 |

The resulting closed cell foamed article had a density of 2.34 pounds per cubic foot and a Shore OO durometer of 36.

EXAMPLE 3

The method described in Example 1 was used to prepare a foamed article having the following formulation:

| Formulation Component | Example 3 Parts per hundred resin (PHR) |
| --- | --- |
| VLDPE (grafted with 0.9% MAH) | 30 |
| EVA (28% VA content) | 70 |
| Zinc Oxide | 0.2 |
| Azodicarbonamide | 14 |
| Dicumyl Peroxide 40% | 1 |
| Antioxidant | 0.2 |

The resulting foamed article was a closed cell foam.

EXAMPLE 4

The method described in Example 1 was used to prepare foamed articles having the following formulations:

| | Example 4A | Example 4B | Example 4C |
| --- | --- | --- | --- |
| EVA (28% VA content) | 60 | | 80 |
| EVA (23% VA content) | | 80 | |
| EVA (17% VA content) | 30 | | |
| EVA (40% VA content) | | | 15 |
| EPDM | 10 | 10 | |
| VLDPE (grafted with 0.8% MAH) | | | 5 |
| Single-site initiated VLDPE | | 10 | |
| Azodicarbonamide | 15 | 14 | 20 |
| Zinc oxide | 0.05 | 0.05 | 0.13 |
| dicumyl peroxide | 1 | 1 | 1.2 |
| antioxidant | | 0.1 | 0.3 |
| clay | | 10 | |

The high pressure mold had dimensions of 1.25 inch×6 inch×6 inch. The mold containing the hot compound was put between heated high pressure hydraulic press platens under pressure for 45 minutes at 295° F. at 500 psi. The mold was released and the resulting material was removed from the hydraulic press mold and inserted into a lower pressure mold cavity (i.e., oven). The material was allowed to complete cross-linking and expansion in the lower pressure mold cavity for about 30 minutes at 330° F. The mold cavity and foamed material therein was cooled with water to room temperature.

A dip test procedure was performed on each of the samples. A foam sheet was skived to a thickness of one inch. The one inch thick foam sheet was cut into strips having a width of two inches and a length of twelve inches. A polyvinylchloride (PVC) dip solution was prepared from an acceptable base source, such as Flexibar 821-4019 solvent vinyl scarlet base, available from Flexibar Corporation. The base was mixed until uniform dip solution was formed. The dip solution was maintained at 70±3° F. at a relative humidity of 50 percent and atmospheric pressure.

Each foam strip was held vertically above the dip solution. The lower end of the foam strip was immersed approximately four inches into the dip. The foam strip was removed from the dip solution immediately after placing it in the dip. The dipped foam strip was held over the container of dip solution to permit the excess material to drip off. The wet dipped foam strip was place on a surface in a manner to avoid contacting the dip layer portion of the foam strip. The dip layer was allowed to air dry for about one hour. The dried single layer coated foam strip was dipped a second time following the same procedure. The double dipped foam strip was allowed to air dry for twenty four hours.

The quality of the dip layer was probed using two peel tests. In the cut and peel test, a knife blade was used to slit the dried dipped area, the dip layer was peeled back at knife cut, and the foam was examined for tears in the foam and/or for ease of peeling. In the rub and peel test, a section of the dip layer was rubbed with a thumb for about thirty seconds, the rubbed area (or blister if a blister formed) was peeled back, and the foam was examined for tears in the foam and/or for ease of peeling.

The resulting closed cell foam had the physical properties summarized in Table II.

TABLE II

| | Example 4A | Example 4B | Example 4C |
|---|---|---|---|
| Density | 2.08 | 2.29 | 1.44 |
| Tensile | 47 | 53.84 | 45 |
| Elongation | 452 | 367 | 337 |
| 25% Compression Deflection | 2.4 | 2.9 | 2.49 |
| 50% Compression Deflection | 7.95 | 8.75 | 8.59 |
| 50% Compression Set | 28.78 | 32.8 | 30.12 |
| Tear Die "C" | 6.7 | 7.96 | 4.92 |
| Split tear | 4.65 | 4.93 | |
| Shore A durometer | 0 | 0 | 0 |
| Shore C durometer | 0 | 0 | 0 |
| Shore OO durometer | 18 | 22 | 25 |
| Cell size mode mm | 0.2 | 0.2 | 0.2 |
| Cell size min. mm | 0.05 | 0.05 | 0.05 |
| Cell size max. mm | 0.4 | 0.4 | 0.4 |
| Appearance | few small voids in foam | some voids in foam | fine celled nice foam |
| PVC dip | sticks but can peel off | sticks but can peel off | better bond dip to foam |

EXAMPLE 5

The method described in Example 1 was used to prepare a foamed articles having the following formulations:

| | Example 5A | Example 5B | Example 5C | Example 5D |
|---|---|---|---|---|
| EVA (28% VA content) | | | | 10 |
| EVA (18% VA content) | | 80 | | |
| EPDM (grafted with 0.7% MAH) | | 20 | 10 | |
| EPDM (Uniroyal Chemical Royaltuf EDPM 490, grafted with MAH) | | | | 10 |
| EPDM | 50 | | | |
| VLDPE (grafted with 0.9% MAH) | 10 | | | |
| Single site initiated VLDPE | 40 | | 90 | 80 |
| Zinc Stearate | | | 0.3 | |
| Azodicarbonamide | 14 | 14 | 14 | 14 |
| p,p'-oxybis (benzenesulfonyl hydrazide) | | 0.1 | | 0.1 |
| Zinc oxide | 0.13 | 0.2 | | 0.2 |
| dicumyl peroxide 40% | 1 | 1.75 | 2.25 | 1.75 |
| antioxidant | 0.3 | | 0.2 | 0.2 |

The high pressure mold had dimensions of 1.25 inch×6 inch×6 inch. The mold containing the hot compound was put between heated high pressure hydraulic press platens under pressure for 50 minutes at 295° F. at 1960 psi (60 minutes at 900 psi for Example 5A). The mold was released and the resulting material was removed from the hydraulic press mold and inserted into a lower pressure mold cavity (i.e., oven). The material was allowed to complete cross-linking and expansion in the lower pressure mold cavity for about 30 minutes at 330° F. The mold cavity and foamed material therein was cooled with water to room temperature. The materials were tested by PVC dip coating as described in Example 4.

The resulting foam had the physical properties summarized in Table III.

TABLE III

| | Example 5A | Example 5B | Example 5C | Example 5D |
|---|---|---|---|---|
| Density (pcf) | 1.90 | 2.08 | 2.33 | 2.04 |
| 25% Compression Deflection | 1.9 | | | |
| 50% Compression Deflection | 7.4 | | | |
| 50% Compression Set | 30 | | | |
| Tear Die "C" | 5.05 | | | |
| Shore OO durometer | 20 | 32 | 42 | 38 |
| Cell size mode mm | 0.3 | | | |
| Cell size min. mm | 0.05 | | | |
| Cell size max. mm | 0.6 | | | |
| Appearance | good quality foam | good quality foam | satisfactory foam, had some voids | satisfactory foam |
| PVC dip | improved dip bond | improved dip bond | satisfactory dip | satisfactory dip |

EXAMPLE 6

Four EVA copolymers having different vinyl acetate contents were used to formulate Example 6A (9% vinyl acetate), Example 6B (17% vinyl acetate), Example 6C (23% vinyl acetate), and Example 6D (28% vinyl acetate). The samples had the following general formulation:

| Component | Weight percent (%) |
|---|---|
| EVA copolymer | 56.3 |
| VLDPE (grafted with 0.8% MAH) | 13 |
| Foaming Agent Compound | 29.3 |
| Dicumyl Peroxide Compound | 1.3 |

The foaming agent compound was 40 percent azodicarbonamide in 60 percent EVA copolymer. In Examples 6A and 6B, the foaming agent was compounded with a 9% vinyl acetate EVA copolymer. In Examples 6C and 6D, the foaming agent was compounded with a 23% vinyl acetate EVA copolymer. The dicumyl peroxide compound was 60% dicumyl peroxide dispersed in an acrylic polymer.

For each example, the materials were dry blended and extruded in a single screw extruder to form a rod having a diameter of about 0.5 inches. The rod was cut to pieces having lengths of approximately four inches. The rods were placed in a circulating hot air oven at a temperature of 450° F. The rods were left in the oven until they fully expanded, as observed visually through an oven window.

Each of Examples 6A–6D produced foamed articles having uniform fine cells. The foamed articles were less tacky and had more hot strength than equivalent foamed articles produced using peroxide cross-linking without containing maleic anhydride. The reduced tackiness and increase hot strength of the foamed articles including maleic anhydride indicates that foamed articles that are normally difficult to handle in a conventional horizontal foaming oven due to sticking to a conveyor belt and structural weakness can be processed effectively by including maleic anhydride.

EXAMPLE 7

Samples were prepared having the following formulations:

| Component | Example 7A | Example 7B | Example 7C |
|---|---|---|---|
| | Weight percent (%) | | |
| Silane grafted EVA Copolymer (9% VA) | 61.5 | 67.5 | 57.5 |
| Catalyst Compound | 3.5 | 3.5 | 3.5 |
| Foaming Agent Compound | 15.5 | 15.5 | 15.5 |
| EVA resin (23% VA) | 11.0 | | |
| VLDPE (grafted with 0.8% MAH) | | 5.0 | 5.0 |
| Activator Compound | 6.0 | 6.0 | 6.0 |
| White Color Concentrate | 2.5 | 2.5 | 2.5 |

Example 7A was a control sample that did not contain maleic anhydride. The EVA resin added to Example 7A had a VA content from 5% to 50% to regulate overall VA level in the product.

The silane grafted EVA copolymer was prepared by grafting Exxon LD319 (9% VA content) with 0.37 percent vinyl trimethoxysilane (VTMOS) using dicumyl peroxide as the grafting initiator (20:1 VTMOS:dicumyl peroxide). The catalyst compound was 1.2 percent dibutyltin dilaurate in LDPE. The catalyst compound included 1 percent of a phenolic antioxidant (IRGANOX 1010). The foaming agent compound was 40 percent azodicarbonamide in LDPE. The activator compound was 30 percent zinc salt (10 percent zinc oxide and 20 percent zinc stearate) in LDPE. The white color concentrate was 50 percent $TiO_2$ in LDPE.

The formulation was dry blended and extruded into a sheet using a 2.5 inch extruder. The resultant sheet had a thickness of between 0.025 to 0.027 inches and a width of 8.1 inches. The extrusion temperature was maintained below 280° F. to avoid prefoaming of the sheet as it exits the die.

The extruded sheet was cross-linked by exposure to moisture in a condensing atmosphere at 150° F. wet bulb temperature for a period of 16 hours. The cross-linked sheet was foamed by passing through a chamber where it was exposed on both surfaces to a combination of infrared and hot air heating. The temperature of the sheet was raised to about 450° F., which activated the foaming agent and caused the material to expand.

The properties of the foamed articles are summarized in Table IV.

TABLE IV

| | Example 7A | Example 7B | Example 7C |
|---|---|---|---|
| Density (pcf) | 4.8 | 5.1 | 4.8 |
| 50% Compression Set | 20 | 18 | 20 |
| Cell size mode (mm) | 0.2 | 0.2 | 0.3 |

The thin foamed articles of Example 7 can be coated with an adhesive. The additional polarity of the maleic anhydride can improve bonding of the foamed articles to the adhesive.

EXAMPLE 8

The method described in Example 1 was used to prepare foamed articles having the following formulations:

| | Example 8A | Example 8B | Example 8C |
|---|---|---|---|
| VLDPE | 5 | | |
| VLDPE (grafted with 0.9% MAH) | | | 5 |
| EVA (40% VA content) | 15 | 15 | 15 |
| EVA (28% VA content) | 80 | 80 | 80 |
| Dicumyl peroxide 40% | 3 | 3 | 3 |
| Antioxidant | 0.3 | 0.3 | 0.3 |

The compounded material was removed from the mill as 0.25 inch thick square sheets (6 inches by 6 inches). The minimum torque of mixing for Example 8A was 686, for Example 8B was 665, and for Example 8C was 656.

The mold containing the hot compound was put between heated high pressure hydraulic press platens under pressure for 30 minutes at 295° F. at 900 psi. The mold was released and the resulting material was removed from the hydraulic press mold. The material was cooled to room temperature in air.

Each formulation of Example 8 yielded a translucent, solid cross-linked sheet. The material of Example 8A was slightly tacky and had a Shore A durometer of 76. The material of Example 8B was slightly tacky and had a Shore A durometer of 72. The material of Example 8C, which included a maleic anhydride-grafted component, was not tacky, was easy to process (e.g., milling produced the lowest torque). The material of Example 8C was softer than that of Example 8A or Example 8B, having a Shore A durometer of 69.

EXAMPLE 9

A grafted VLDPE resin and a control VLDPE resin were each compounded with other ingredients by the method described in Example 1 to give a mixture having the following formulations:

| | | Example | |
|---|---|---|---|
| Formulation: | Material | 9A | 9B |
| DOW 180 | Single-site initiated VLDPE | 35 | 35 |
| NORDEL NDX 4520 | Single-site initiated EPDM | 14.3 | 14.3 |
| DEFB 1373 | 1% MAH VLDPE | | 10.7 |
| GERS 1085 | VLDPE | 10.7 | |
| DRAKEOL #34 oil | Mineral oil | 40 | 40 |
| Total: | | 100 | 100 |

This example demonstrates the use of a MAH grafted resin to aid the incorporation of oil into polyolefinic compounds for product and property revisions as well as for cost reduction.

| Results: Oil Bleed (time/temp) | Example 9A | Example 9B |
|---|---|---|
| 8 hr/RT | oil on surface | no oil observed |
| 30 day/RT | oil on surface | no oil observed |

-continued

| Results: Oil Bleed (time/temp) | Example 9A | Example 9B |
|---|---|---|
| 60 day/RT | oil on surface | no oil observed |
| 4 hr/150° C. | oil on surface | no oil observed |

The MAH grafted compound (Example 9B) was soft and pliable, yet had no oily or slippery feel to it. The Shore A durometer was 33. Example 9A, prepared compound with 30 parts per hundred oil, had a Shore A durometer of 45.

EXAMPLE 10

The method described in Example 1 was used to prepare a foamed article having the following formulation:

| Formulation: | Type | Example 10A |
|---|---|---|
| FLEXIMER DEFB 1373 | MAH grafted VLD | 10 |
| At 2803 | EVA/28% VA | 30 |
| AT-1711 | EVA/17% VA | 60 |
| 911 CZnO | Zinc Oxide | 0.4 |
| SYNPRO ZNSTEARATE | Zinc Stearate | 1.5 |
| AC-1000 blow agent | Axodicarbonamide | 18 |
| DMF-100 silicone oil | Silicone oil | 0.6 |
| Camelwhite ST | Calcium carbonate | 20 |
| LUPERCO 500 40KE | Dicumyl peroxide/ 40% active | 1.75 |
| DRAKEOL #34 | Mineral oil | 5 |

The preformed material, while hot from mixing, was placed into a preheated rectangular 1.25 inch×6 inch×6 inch mold cavity, and was put between heated high pressure hydraulic press platens under pressure. The material was heated for 25 minutes at 260° F. at 400 psi in the mold and then released. The material was then removed mold size from the hydraulic press mold, placed into a 4 inch×12 inch×12 inch mold in a hot air oven. The material was permitted to expanded for approximately 75 minutes at 330° F.

The formulation yielded a uniform fine celled foamed article without voiding or "rollover." The incorporation of the MAH graft segment into the compound produced an acceptable open cell type foam.

EXAMPLE 11

Single-site initiated EPDM and single-site initiated PE resins were compounded with VLDPE and MAH grafted VLDPE resins according to the following formulations:

| Formulation: | Type | Example 11A | Example 11B |
|---|---|---|---|
| DEFB-1373 NT | MAH Grafted VLDPE | 5 | |
| NORDEL NDX 4520 | Single-site EPDM | 50 | 50 |
| Dow ELITE 5200 | Single-site PE | 45 | 50 |
| IRGANOX 1010 | Antioxidant | 0.2 | 0.20 |
| AC-1000 blow agent | Azodicarbonamide | 1.75 | 1.75 |
| CelogenOT/ Unicell OH | Oxybis (benzenesulfonyl hydrazide) | 1 | 1 |
| Synpro Zinc Stearate | Zinc Stearate | 1 | 1 |
| KADOX 911C | Zinc Oxide | 2 | 2 |

-continued

| Formulation: | Type | Example 11A | Example 11B |
|---|---|---|---|
| LUPERCO 500-40KE | 40% Dicumyl peroxide | 2 | 2 |
| CAMELWITE ST | Calcium Carbonate | 33.334 | 33.334 |
| DRAKEOL #34 OIL | Mineral oil | 2 | 2 |
| Techmer White 1701 | $TiO_2$ 60% PE | 2 | 2 |
| UVI 531 | UV inhibitor | 0.1 | 0.1 |
| density | | 21 pcf | 22 pcf |

The materials used in this example were prepared under laboratory conditions. A laboratory scale two roll open mill, with the rolls set at approximately 250° F. was used to mix the compound. The subsequent compounds were removed from the mill in approximately 0.375 inch sheet(s). The material in sheet form was made into a preform for molding in a 1.25 inch×6 inch×6 inch high pressure hydraulic press mold.

The preformed material, while hot from mixing, was placed into a preheated rectangular mold cavity. The material was crosslinked and foamed in a single step foaming process. The mold containing the hot compound was heated under pressure between hydraulic press platens for 55 minutes at 305° F. at 900 psi and then released. The resultant foamed material was removed from the mold and allowed to cool.

The compound formulation yielded a fine celled, high density foam. The density of the MAH graft formulation, 11A, was 21 pcf, while the density of the control, 11B, was 22 pcf.

EXAMPLE 12

VLDPE resins with different MAH graft levels system are used in this example with a peroxide crosslinking to regulate the crosslinking rates and the foaming reactions. Both a control formulation and a formulation using a non MAH grafted VLDPE resin similar to the grafted resins were included for comparison. In addition, a formulation using a different MAH graft level was included to test the effect of different MAH levels. The method described in Example 11 was used to prepare foamed articles having the following formulations:

| Formulation: | Example 12A | Example 12B | Example 12C | Example 12D |
|---|---|---|---|---|
| EXXELOR VA 1803 (0.7% MAH) | | | | 5 |
| EXXON 117.08 | 100 | 95 | 95 | 95 |
| DEFB 1373 (1% MAH) | | 5 | | |
| GERS 1085 (non MAH-VLDPE) | | | 5 | |
| IRGANOX 1010 | 0.1 | 0.1 | 0.1 | 0.1 |
| CELLCOM AC 1000K | 14 | 14 | 14 | 14 |
| KADOX 911C | 0.25 | 0.25 | 0.25 | 0.25 |
| FREEMAN DICUP | 1 | 1 | 1 | 1 |
| STANLUBE 60 | 0.5 | 0.5 | 0.5 | 0.5 |
| UVI 531 | 0.5 | 0.5 | 0.5 | 0.5 |
| Total: | 116.35 | 116.35 | 116.35 | 116.35 |
| Density | 2.04 pcf | 1.69 pcf | 1.92 pcf | 1.74 pcf |
| Durometer OO | 59 | 45 | 54 | 49 |
| Initial 25% Compression Set | 16.67 | 25.13 | 17.94 | |
| 7 day aged 25% | 16.6 | 19.96 | 16.8 | |

-continued

| Formulation: | Example 12A | Example 12B | Example 12C | Example 12D |
|---|---|---|---|---|
| Compression Set | | | | |
| cell size medium | 0.3 | 0.1 | 0.4 | 0.1 |
| cell size medium | 0.1 | 0.05 | 0.2 | 0.3 |
| cell size max. | 0.5 | 0.2 | 0.8 | 0.1 |

Figure 2:
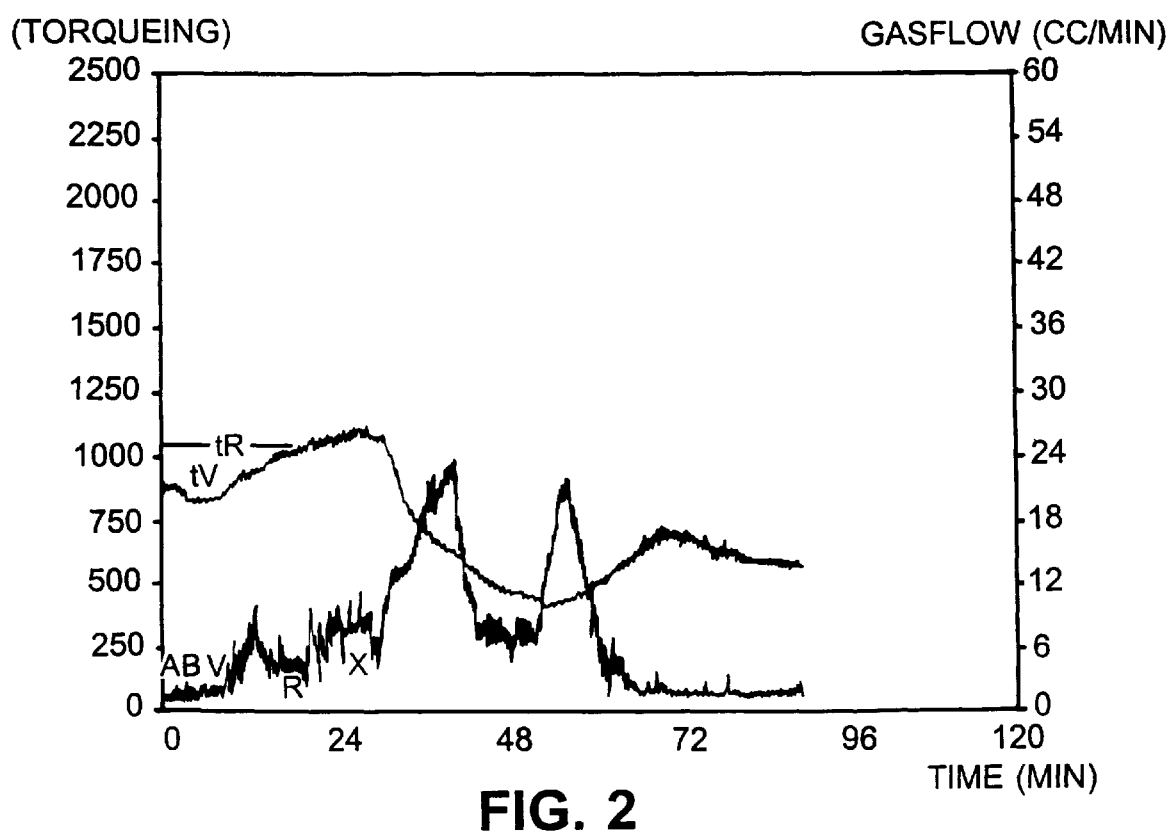
FIG. 2 is a graph depicting the cross-linking rate, as indicated by an increase in torque in the mixer over time, of a LDPE resin compounded with a 1 percent MAH grafted VLDPE resin.
Figure 3:
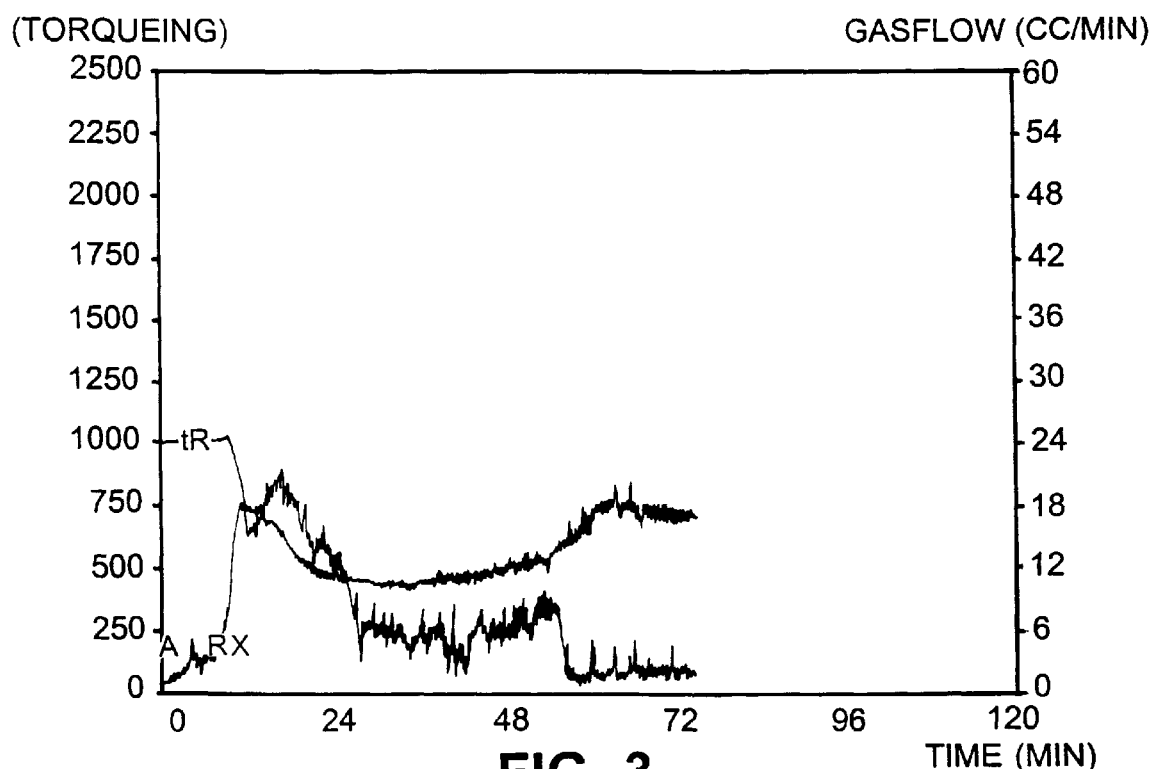
FIG. 3 is a graph depicting the cross-linking rate, as indicated by an increase in torque in the mixer over time, of a LDPE resin compounded with a non-MAH grafted VLDPE resin.
Figure 4:
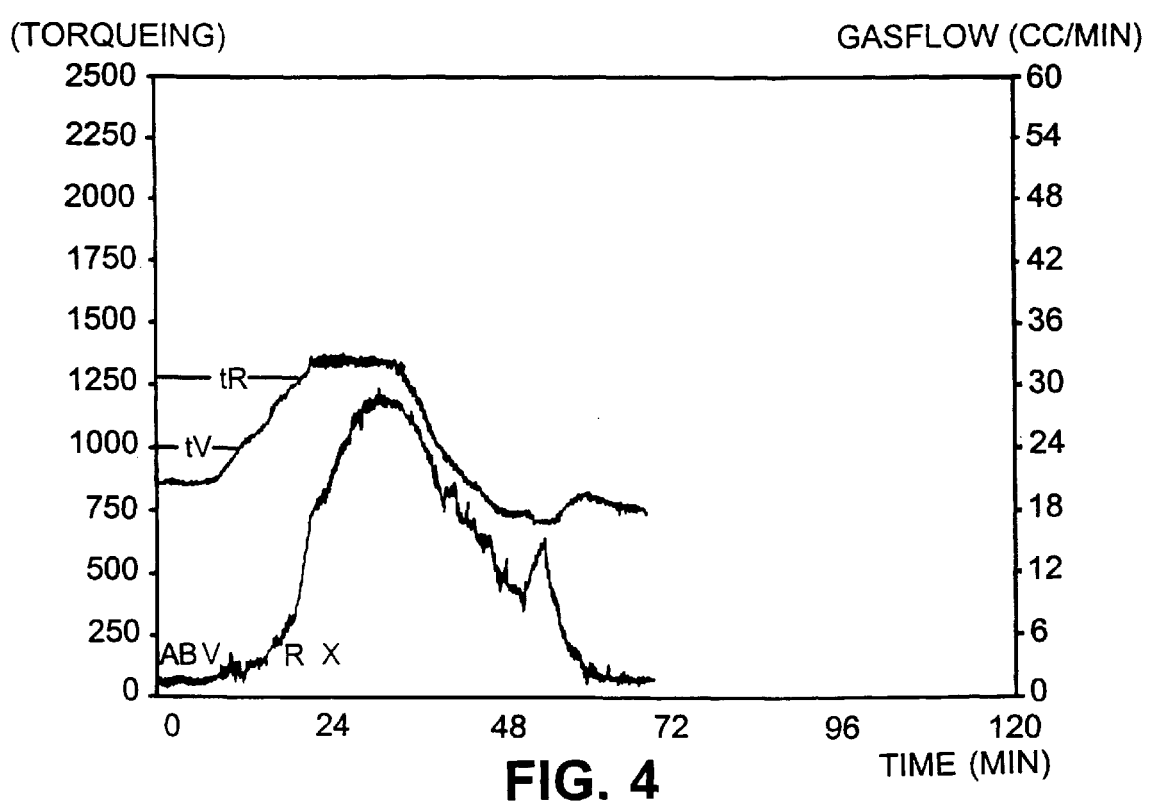
FIG. 4 is a graph depicting the cross-linking rate, as indicated by an increase in torque in the mixer over time, of a LDPE resin compounded with a 0.7 percent MAH grafted EPDM resin.

The different compounds yielded fine celled foamed articles. The material which contained the non-MAH VLDPE addition, 12C, indicated similar crosslinking and decomposition rates as the control, 12A. The material compound containing the MAH resins demonstrated changes in the crosslinking rate and in the foaming agent decomposition as indicated by Brabender analysis. See FIGS. 1–4, which correspond to 12A–12D, respectively. The curves in FIG. 3, compared to the control material shown in FIG. 1, indicates that the addition of MAH promotes a change in reaction rates. FIGS. 2 and 4 illustrate changes in crosslinking and decomposition rates which can be regulated for improvement in processing by the addition of MAH.

EXAMPLE 13

A crosslinkable polymer blend was produced for use in the formulations below. To produce the crosslinkable polymer blend, vinyltrimethoxy silane and Vul-cup (DuPont) peroxide were mixed in a ratio of 20 parts by weight silane to 1 part by weight peroxide. Then, a polymer blend was prepared containing 50% Elite 5200 polyethylene (Dow) and 50% Nordel IP 4520 EPDM. Finally, 0.37 parts by weight of the above silane/peroxide mixture was mixed with the polymer blend to form the crosslinkable polymer blend. The reaction was carried out in a single screw extruder at a temperature of 450–475° F.

Compositions using the crosslinkable polymer blend were then prepared using the following formulations:

| Formulation: | Example 13A | Example 13B |
|---|---|---|
| Crosslinkable polymer blend | 0.661 | 0.611 |
| Dibutyltin dilaureate concentrate (1.2% active) | 0.036 | 0.036 |
| Foaming agent concentrate (40% azodicarbonamide in LDPE) | 0.235 | 0.235 |
| Zinc activator (20% zinc stearate, 10% zinc oxide in LDPE) | 0.043 | 0.043 |
| Union Carbide DEFB 1373 NT (1% MAH grafted on a 2 MI, 904 density VLDPE copolymer) | | 0.050 |
| Titanium Dioxide Concentrate (50% in LDPE) | 0.025 | 0.025 |

Sheets having a 2.5 inch diameter were then extruded on a single screw extruder with a flat sheet die. The extrusion melt temperature was 270–280° F. The sheet was 0.026 inches thick and 8.5 inches wide.

The crosslinkable sheets were then placed in an environmental chamber for 16.5 hours at 150° F. with 145° F. minimum dew point. This exposure causes the silane linkages to crosslink.

The sheets having a 2.5 inch diameter were then passed continuously through a foaming oven where they were exposed to a combination of infrared and hot air (500° F.) heating, which causes the materials to expand. The foamed material was collected as a roll on a winder. Finished dimensions of the sheets were 0.120–0.180 inch thickness and 16–17 inch width. Properties of the foamed articles are listed below:

| Property | 13A | 13B |
|---|---|---|
| Density | 3.3 | 3.3 |
| Average Tensile Strength | 36 | 34 |
| Average Elongation | 450 | 332 |
| Compression Resistance-25% | 5.1 | 4.6 |
| Compression Resistance-50% | 15.2 | 12.9 |
| Compression Set-50% | 40 | 31 |
| Tear Strength-die "C" | 11 | 10 |
| Hardness (SHORE OO) | 55 | 47 |
| Cell size-mode | 0.30 | 0.30 |
| Cell size-range | 0.05–0.6 | 0.050–0.6 |
| Thermal Shrinkage-avg. of 3 dimensions (50 h @200F) | −1.4 | −1.7 |

The foamed article produced with MAH grafted polyolefinic polymer had improved compression set over the similar foamed article without MAH grafted polyolefinic polymer. The foamed article was also softer as shown in reduced compression resistance and hardness.

EXAMPLE 14

A crosslinkable polymer blend was produced for use in the formulations below. A polymer blend was prepared containing 30% DuPont Dow Engage 8200 single-site initiated polyolefin, 25% Engage 8445, 38% (9% vinyl acetate ethylene copolymer), 3% Ampacet process aid concentrate, and 4% Ampacet antiblock concentrate. 0.37 parts by weight of the silane/peroxide mixture from Example 13 was mixed with the polymer blend to form the crosslinkable polymer blend. The reaction was carried out in a single screw extruder at a temperature of 450–475° F. Compositions were then prepared from the blend using the following formulations:

| Formulation: | Example 14A | Example 14B |
|---|---|---|
| Crosslinkable polymer blend | 0.725 | 0.675 |
| Dibutyltin dilaureate concentrate (1.2% Active) | 0.035 | 0.035 |
| Foaming agent concentrate (40% azodicarbonamide in LDPE) | 0.155 | 0.155 |
| Zinc activator compound (20% zinc stearate, 10% zinc oxide in LDPE) | 0.060 | 0.060 |
| Union Carbide DEFB 1373 NT (1% MAH grafted on a 2 MI, 904 density VLDPE copolymer) | | 0.050 |
| Titanium Dioxide Concentrate (50% in LDPE) | 0.025 | 0.025 |

The sheets were extruded on a 2.5 inch diameter single screw extruder with a flat sheet die. Extrusion melt temperature was 275–280° F. The sheet was 0.026–0.027 inches thick and 8.1 inches wide.

The crosslinkable sheets were then placed in an environmental chamber for 17 hrs. at 150° F. with 145° F. minimum dew point. This exposure caused the silane linkages to crosslink.

The sheets were then passed continuously through a foaming oven where they were exposed to a combination of infrared and hot air (500° F.) heating, which causes the materials to expand. The foamed material was collected as a roll on a winder. Finished dimensions of the sheets were 0.050–0.080 inch thickness and 20–22 inch width. Properties of the finished foamed articles are below:

| Property | 14A | 14B |
|---|---|---|
| Density | 4.8 | 5.4 |
| Average Tensile Strength | 123 | 132 |
| Average Elongation | 448 | 451 |
| Compression Resistance-25% | 8.3 | 8.6 |
| Compression Resistance-50% | 18.6 | 20.1 |
| Compression Set-50% | 10.8 | 9.7 |
| Tear Strength-die "C" | 22 | 27 |
| Hardness (SHORE OO) | 64 | 65 |
| Cell size-mode | 0.30 | 0.20 |
| Cell size-range | 0.05–0.7 | 0.05–0.5 |
| Thermal Shrinkage-avg. of 3 dimensions (50 h @ 200F) | −2.1 | −2.2 |
| Gel level by Xylene extraction | 51.6% | 51% |
| Surface Energy (Dyne Pens method) | <31 | 35 |

14B demonstrated an increase in tear strength and a reduction in cell size. The surface energy has been raised from <31, the minimum value obtainable using this testing method, to 35 dynes. This observation is confirmed by applying a strip of masking tape to each foam surface. The tape is more difficult to peel from the foamed article containing MAH.

EXAMPLE 15

A crosslinkable polymer blend was produced for use in the formulations below. A polymer blend was prepared containing 70% Montell Polypropylene SD 632 and 30% Dow Elite 5200. 0.37 parts by weight of the silane/peroxide mixture from Example 13 was mixed with the polymer blend to form the crosslinkable polymer blend. The reaction was carried out in a single screw extruder at a temperature of 450–475° F.

Compositions were then prepared from the blend using the following formulations:

| Formulation: | Example 15A | Example 15A |
|---|---|---|
| Crosslinkable polymer blend | 0.701 | 0.501 |
| Dibutyltin dilaureate concentrate (1.2% active) | 0.010 | 0.010 |
| Foaming agent concentrate (40% azodicarbonamide in LDPE) | 0.280 | 0.280 |
| Union Carbide DEFB 1373 NT (1% MAH grafted on a 2 MI, 904 density VLDPE copolymer) | 0.000 | 0.200 |
| Techmer Blue Color Concentrate (PM 5804) | 0.009 | 0.009 |

Sheets having a 2.5 inch diameter were then extruded on a single screw-extruder with a flat sheet die. The extrusion melt temperature was 270–280° F. The sheet was 0.026 inches thick and 8.5 inches wide.

The crosslinkable sheets were then placed in an environmental chamber for 16.5 hours at 150° F. with 145° F. minimum dew point. This exposure causes the silane linkages to crosslink.

The sheets having a 2.5 inch diameter were then passed continuously through a foaming oven where they were exposed to a combination of infrared and hot air (500° F.) heating, which causes the materials to expand. The foamed material was collected as a roll on a winder.

The non MAH formulation, 15A, produced poor expansion and a collapsed foam. The density was in excess of 20 pcf. 15B, containing 20% MAH copolymer, produced a foamed article with fine cells and smooth skin. The density was 5.7 pcf.

EXAMPLE 16

A MAH grafted resin with a peroxide crosslinking system is used to produce a foamed article whose compound ingredients make it difficult or impossible to produce a low density closed cell foamed article without the MAH grafted resin. The materials used in this example were prepared under laboratory conditions. The polymers and MAH grafted resin were compounded by the method described in Example 11 as in the following formulations:

| Formulation | | Example 16 |
|---|---|---|
| Dow 510 | LDPE | 50 |
| IP Nordel NDX 4520 | Single site initiated EPDM | 20 |
| GERS 1085 | VLDPE | 25 |
| DEFP-1373 | MAH-grafted VLDPE | 5 |
| BENNOX 1010 | Antioxidant | 0.5 |
| AC-1000 blowing agent | Azodicarbonamide | 14 |
| CELOGEN OT | Oxybis(benzene-sulfonyl hydrazide | 0.1 |
| KADOX 911C | Zinc Oxide | 0.233 |
| LUPERCO 500-40KE | DCP 40% active | 1.75 |
| DRAKEOL #34 Oil | Mineral Oil | 30 |
| Typical Property | | |
| Density | | 2.52 |
| Tensile | | 29.00 |
| Elongation | | 323.00 |
| 25% Compression deflection | | 5.39 |
| 50% Compression deflection | | 13.22 |
| 50% Compression set | | 19.69 |
| 50% Compression set | | 38.06 |
| Tear Die (lbf/in) | | 8.0 |
| Duro. (SHORE A) | | 5 |
| Duro. (SHORE C) | | 0 |
| Duro. (SHORE OO) | | 48 |
| Cell Size Mode (OCCULAR) | | 0.20 |
| Linear Shrinkage 50 Hrs @ 93C | | <5.00% |

The compound formulation yielded a fine celled foam.

EXAMPLE 17

The method described in Example 1 was used to prepare foamed articles having the following formulations:

| Formulation: | Type | Example 17A | Example 17B |
|---|---|---|---|
| Dow 510 | LDPE | 50 | |
| Dow 8180 | Single site PE | 25 | 25 |
| IP NORDEL NDX 4520 | Single site EPDM | 20 | 20 |
| Novacor 0219 | LDPE | | 50 |
| DEFB-1373 | MAH-grafted VLDPE | 5 | 5 |
| BENNOX 1010 | Antioxidant | 0.5 | 0.5 |
| AC-1000 blowing agent | Azodicarbonamide | 16 | 16 |

-continued

| Formulation: | Type | Example 17A | Example 17B |
|---|---|---|---|
| CELOGEN OT | oxybis(benzene-sulfonyl hydrazide) | 0.1 | 0.1 |
| KADOX 911C | Zinc Oxide | 0.233 | 0.233 |
| LUPERCO 500-40KE | DCP 40% active | 2.125 | 2.125 |
| DRAKEOL #34 Oil | Mineral Oil | 30 | 30 |

This example demonstrates the use of MAH grafted resin with a peroxide crosslinking system used to produce a preferred foam material in comparison to materials not containing a MAH grafted segment.

The preformed material, while hot from mixing, was placed into a preheated rectangular mold cavity. The mold containing the hot compound was put between heated high pressure hydraulic press platens under pressure. The material was heated for 45 minutes at 305° F. at 900 psi in the mold and then released. The resultant material was then removed mold size from the hydraulic press mold, placed into a hot air oven, and expanded for approximately 45 minutes at 330° F.

Both formulations yielded a fine celled foam. When the MAH graft segment is not used, the formulation with the Novacor 0219 LDPE yields a low quality foamed article, having voids and cracks throughout the material.

EXAMPLE 18

This example demonstrates the use of MAH grafted resin with a peroxide crosslinking system to enhance the production of a fine celled closed cell ethylene-acrylic elastomer foam. Formulations with varied peroxide concentration levels were used to investigate the effects on the crosslinking and foaming systems as well as the ultimate physical properties, particularly compression set. A similar compound but without MAH graft (i.e., 100 parts VAMAC) produced a low quality foamed article. The method described in Example 11 was used to prepare foamed articles having the following formulations:

| Formulation: | Example 18A | Example 18B | Example 18C | Example 18D | Example 18E |
|---|---|---|---|---|---|
| Fleximer DEFB 1373 | 5 | 5 | 5 | 5 | 5 |
| VAMAC G | 95 | 95 | 95 | 95 | 95 |
| BENNOX 1010 | 0.5 | 0.5 | 0.5 | 0.5 | 0.5 |
| CELLCOM AC 1000K | 1.067 | 1.067 | 1.067 | 1.067 | 1.067 |
| CELOGEN OT/UNICELL | 0.1 | 0.1 | 0.1 | 0.1 | 0.1 |
| KADOX 911C | 2 | 2 | 2 | 2 | 2 |
| LUPERCO 500-40KE | 3 | 3.75 | 5 | 6.25 | 7.5 |
| DRAKEOL #34 OIL | 10 | 10 | 10 | 10 | 10 |
| Camelwite ST | 66.67 | 66.67 | 66.67 | 66.67 | 66.67 |
| Total: | 183.337 | 184.087 | 185.337 | 186.587 | 187.837 |

| Results: | 18A | 18B | 18C | 18D | 18E (some voids) |
|---|---|---|---|---|---|
| density no skin | 24.36 | 23.97 | 25.57 | 28.1 | 28.43 |
| 50cs thermal 24 hr 350° F. | 13.41 | 10.2 | 7.15 | 6.26 | 5.52 |
| length | −14.08 | −9.90 | −12.37 | −15.15 | −15.90 |
| width | −9.00 | −8.25 | −13.40 | −16.16 | −14.72 |
| thickness | −10.00 | −12.87 | −17.00 | −20.20 | −19.19 |
| Durometer OO | 59 | 63 | 66 | 70 | 73 |

The different compounds yielded fine celled foamed articles. Example 18E, containing the highest level of peroxide in combination with the MAH grafted resin, yielded the lowest compression set value. However, the resultant foamed article contained over cure voids. Example 18D yielded the next best compression set value but did not exhibit voiding.

EXAMPLE 19

This example illustrates the advantages of using MAH grafted materials to incorporate in reclaimed polyolefinic materials, non-crosslinked or crosslinked, foamed, or solid, into foamed articles. Samples were prepared having the following formulations:

| Formulation: | Material | Example 19A | Example 19B | Example 19C | Example 19D |
|---|---|---|---|---|---|
| FUSSBOND 190D | 0.8% MAH grafted EVA | | | 5 | |
| DEFB1373 | 1% MAH grafted VLDPE | | 5 | | |
| PE 1076 | LDPE | 30 | 25 | 35 | 40 |
| WRG white reclaim | Reclaimed x-linked LDPE foam | 70 | 70 | 60 | 60 |
| BENNOX 1010 | Antioxidant | 0.2 | 0.2 | 0.2 | 0.2 |
| Cellcom AC 1000 B/A | Azodiacarbonamide (foaming agent) | 14 | 14 | | |
| Celogen OT | Oxyble(benzenesulfonyl hydrazide) | | | 0.1 | 0.1 |
| KADOX 811C | Zinc oxide | 0.2 | 0.2 | 0.3 | 0.3 |
| Synpro | Zinc suarate | | | 0.3 | 0.3 |
| Dicup 99% Freeman | Dicumyl peroxide (99% active) | 0.9 | 0.9 | 0.7 | 0.7 |
| Total: | | 115.3 | 115.3 | 101.6 | 101.6 |

The materials used in this example were prepared under laboratory conditions. The reclaimed material was made from crosslinked polyolefinic foam. The reclaimed material was granulated but not pulverized, such that it was in the form of a hard irregular granule approximately 0.125 inch diameter. A laboratory scale two roll mill, with the temperature set to yield an approximate surface temperature of 250° F., was used to mix the compounds. The virgin polymer and graft where applicable was melted and fluxed on the mill first. The reclaim granules were then added incrementally to prevent breaking of the band of material on the mill. Following the incorporation of the reclaim materials, the active crosslinking agent, blowing agent, and activators were added. The completed compounds were removed from the mill in a sheet approximately ⅜ inch thick. The sheet was plied up to over 1.25 inch and set into a 1.25 inch thick preheated 6 inch×6 inch square cavity mold in a high pressure hydraulic press. The mold containing the compound was closed and subjected to heat and pressure for a cycle of 50 minutes at 295° F.

At the completion of cycle, the material was removed and cooled. At the higher loading (70%) of reclaim, the composition without the MAH graft additive did not produce an acceptable foamed article. This foamed article was over crosslinked, blistered, voided, and stratified. Conversely, the compound with the MAH graft, which had a 70% loading of reclaim, produced a fine cell 7.5 pcf foamed article.

Both the compound with and the compound without MAH graft additive produced foamed articles at the 60% level. However, the foamed article with the MAH graft was crosslinked more efficiently, exhibited fewer blown out edges, had a tighter cell structure, and had an overall appearance more acceptable than the material without the MAH graft additive.

|  | Example 19A | Example 19B | Example 19C | Example 19D |
| --- | --- | --- | --- | --- |
| Bun Id. | 25 | 26 | 29 | 31 |
| Foam Appearance | stratified voids | fine cell off white stiff | medium cell off white tighter cure | medium cell off white |
| Density (pcf) | N/A | 7.5 | 4.2 | 2.9 |
| Durometer OO | N/A | 83 | 75 | 73 |
| 50% Compression set | N/A | 7.28 | | |

EXAMPLE 20

A solid polymer article was produced with crosslinked thermoset elastomeric materials according to the following formulations:

| Material | Type | Example 20A | Example 20B |
| --- | --- | --- | --- |
| FLEXIMER DFEB1373 | MAH Grafted VLDPE | 5 | 0 |
| VAMAC B-124 | black filled ethylene acrylic | 111.6 | 117.8 |
| VAMAC HG | ethylene acrylic | 5 | 5 |
| BENNOX 1010 | antioxidant | 1 | 1 |
| LUPERCO 500-40KE | 40% dicumyl peroxide | 0.05 | 0.05 |
| LUPERCO 802 40KE | 40% α,α-bis(t-butylperoxy) diisopropyl benzene | 3.25 | 3.25 |
| CAMELWITE ST | calcium carbonate | 100 | 100 |
| | Total | 225.9 | 227.1 |

A laboratory sized two roll open mill with rolls set at approximately 250° F., was used to mix the compound. The completed compounds were removed from the mill in approximately 0.375 inch sheets. The hot compound was made into a preform for molding. The hot material was placed into a 1.250 inch×6 inch×6 inch mold cavity. The mold containing the compound was then pressed in a hydraulic press with heated platens. A single step molding cycle was used. The material was heated under 2000 psi pressure for 25 minutes at 295° F.

At the end of the heating cycle, the hydraulic press was opened and the solid slab was removed. The slab without the MAH graft addition appeared to be soggy and limp, that is, less crosslinked, upon removal from the hydraulic press. However, the material containing the MAH graft produced a firmer solid that was flexible and resilient. Both materials were then heated aged in a hot air oven for 48 hours at 330° F. Both of the materials produced were uniform and consistent.

|  | Example 20A | Example 20B |
| --- | --- | --- |
| Density pcf | 78 | 77 |
| tensile psi | 311 | 260 |
| elongation | 334 | 331 |
| tear die c | 107 | 87 |
| Shore A immediate/5sec. | 60/50 | 55/45 |
| Shore FWD immediate/5sec | 73/67 | 65/55 |
| 50% Compression Set | 6.78% | 6.67% |

Other embodiments are within the claims.

What is claimed is:

1. A method of making a foamed article comprising:
   providing a mixture including a first polyolefinic polymer, an oil, and maleic anhydride, the maleic anhydride being grafted to a portion of the mixture and the mixture including greater than 25 weight percent of the oil;
   cross-linking the mixture sufficiently to form a flexible article having low tackiness; and
   expanding the mixture to form a foamed article.

2. The method of claim 1, wherein the first polyolefinic polymer is grafted with maleic anhydride.

3. The method of claim 1, further comprising the step of grafting maleic anhydride to the first polyolefinic polymer.

4. The method of claim 1, wherein the first polyolefinic polymer is selected from the group consisting of a low density polyethylene, a very low density polyethylene, a linear low density polyethylene, a single-site initiated polyethylene, an ethylene-propylene diene monomer terpolymer, an ethylene-propylene rubber, a single-site initiated ethylene-propylene diene monomer terpolymer, an ethylene-acrylic elastomer, reclaim, and a single-site initiated ethylene-propylene rubber.

5. The method of claim 1, wherein the mixture further comprises an oil.

6. The method of claim 5, wherein the mixture comprises between 30 weight percent and 40 weight percent of the oil.

7. The method of claim 5, wherein the oil is a mineral oil.

8. The method of claim 5, wherein the foamed article has a Shore A durometer greater than 30.

9. The method of claim 1, wherein the mixture further comprises a second polyolefinic polymer.

10. The method of claim 9, wherein the second polyolefinic polymer comprises reclaim.

11. The method of claim 10, wherein the mixture comprises between 10 weight percent and 50 weight percent reclaim.

12. The method of claim 11, where the mixture comprises between 20 weight percent and 30 weight percent reclaim.

13. The method of claim 9, wherein the second polyolefinic polymer comprises an ethylene-propylene diene monomer terpolymer.

14. The method of claim 13, wherein the mixture comprises between 5 weight percent and 50 weight percent of an ethylene-propylene diene monomer terpolymer.

15. The method of claim 13, wherein the mixture comprises between 10 weight percent and 30 weight percent of an ethylene-propylene diene monomer terpolymer.

16. The method of claim 9, wherein the second polyolefinic polymer comprises an ethylene-acrylic elastomer.

17. The method of claim 16, wherein the mixture comprises between 10 weight percent and 50 weight percent of an ethylene-acrylic elastomer.

18. The method of claim 1, wherein cross-linking includes cross-linking with a peroxide.

19. The method of claim 1, wherein cross-linking includes cross-linking with a silane.

20. The method of claim 1, wherein expanding the mixture comprises free expansion of the mixture.

21. The method of claim 1, wherein expanding the mixture comprises compression molding of the mixture.

22. The method of claim 21, wherein compression molding comprises pressing the mixture using a high tonnage press at a temperature of between 240 and 480° F. and a pressure of between 50 and 5000 psi for between 20 and 90 minutes followed by heating the polymer mixture at a temperature between 300 and 380° F.

23. The method of claim 1, wherein the article is a closed cell foam.

24. The method of claim 1, wherein the article is an open cell foam.

25. The method of claim 1, further comprising applying a coating, an adhesive, or a laminated layer to a surface of the article.

26. The method of claim 1, further comprising dipping the article to form a layer on a surface of the article.

27. A foamed article comprising a mixture including a first olefinic polymer, an oil, and maleic anhydride grafted to a component of the mixture, wherein the mixture is cross-linked sufficiently to provide a flexible article having low tackiness, and the mixture includes greater than 25 weight percent of the oil.

28. The foamed article of claim 27, further comprising an oil.

29. The foamed article of claim 28, wherein the oil is a mineral oil.

30. The foamed article of claim 27, wherein the mixture further comprises a second polyolefinic polymer.

31. The foamed article of claim 30, wherein the second polyolefinic polymer comprises reclaim.

32. The foamed article of claim 30, wherein the second polyolefinic polymer comprises an ethylene-propylene diene monomer terpolymer.

33. The foamed article of claim 30, wherein the second polyolefinic polymer comprises an ethylene-acrylic elastomer.

34. The foamed article of claim 27, wherein the first polyolefinic polymer is grafted with maleic anhydride.

35. The foamed article of claim 34, wherein the article includes between about 1 weight percent and about 90 weight percent of the first polyolefinic polymer.

36. The foamed article of claim 34, wherein the article includes between about 5 weight percent and about 30 weight percent of the first polyolefinic polymer.

37. The foamed article of claim 34, wherein the maleic anhydride content of the first polyolefinic polymer is between about 0.01 weight percent and about 10 weight percent.

38. The foamed article of claim 34, wherein the maleic anhydride content of the first polyolefinic polymer is between about 0.4 weight percent and about 2.0 weight percent.

39. The foamed article of claim 27, wherein a portion of the mixture is cross-linked by a peroxide.

40. The foamed article of claim 27, wherein a portion of the mixture is cross-linked by a silane.

41. The foamed article of claim 27, wherein the article has a foam density between about 2 pounds per cubic foot and about 30 pounds per cubic foot.

42. The foamed article of claim 27, wherein the article further comprises a surface having a layer formed by dipping.

43. The foamed article of claim 27, wherein the article further comprises a surface comprising a coating, a laminated layer, or an adhesive.

44. The foamed article of claim 30, wherein the first polyolefinic polymer is selected from the group consisting of a low density polyethylene, a very low density polyethylene, a linear low density polyethylene, a single-site initiated polyethylene, an ethylene-propylene diene monomer terpolymer, an ethylene-propylene rubber, a single-site initiated ethylene-propylene diene monomer terpolymer, an ethylene-acrylic elastomer, reclaim and a single-site initiated ethylene-propylene rubber.

45. The foamed article of claim 30, wherein the second polyolefinic polymer is grafted with maleic anhydride.

46. The foamed article of claim 27, wherein the foamed article is a closed cell foam.

47. The foamed article of claim 27, wherein the foamed article has a 25% compression deflection of less than 3 pounds per square inch.

48. The foamed article of claim 27, wherein the article is a bead or particulate foam.

49. A polymer article comprising a mixture comprising an ethylene-acrylic polymer, an oil, and a maleic anhydride grafted to a portion of the mixture, the mixture including greater than 25 weight percent of the oil.

50. The polymer article of claim 49, further comprising a first polyolefinic polymer, wherein the maleic anhydride is grafted to the first polyolefinic polymer.

51. The polymer article of claim 50, wherein the first polyolefinic polymer is a very low density polyethylene.

52. The polymer article of claim 50, wherein the article includes between about 1 weight percent and about 90 weight percent of the first polyolefinic polymer.

53. The polymer article of claim 50, wherein the maleic anhydride content of the first polyolefinic polymer is between about 0.01 weight percent and about 10 weight percent.

* * * * *